United States Patent
Wicks

(10) Patent No.: US 10,018,108 B2
(45) Date of Patent: Jul. 10, 2018

(54) METHODS FOR ENGINE AIR-PATH REVERSION MANAGEMENT

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 14/729,944

(22) Filed: Jun. 3, 2015

(65) Prior Publication Data

US 2016/0356211 A1 Dec. 8, 2016

(51) Int. Cl.
| | |
|---|---|
| *F02B 41/04* | (2006.01) |
| *F02D 13/02* | (2006.01) |
| *F02B 37/00* | (2006.01) |
| *F02D 41/40* | (2006.01) |
| *F02B 21/00* | (2006.01) |
| *F02D 41/00* | (2006.01) |

(52) U.S. Cl.
CPC ............... *F02B 41/04* (2013.01); *F02B 21/00* (2013.01); *F02D 13/0269* (2013.01); *F02D 41/0007* (2013.01); *F02D 41/401* (2013.01); *F02B 37/00* (2013.01); *F02B 2275/32* (2013.01); *F02D 13/0265* (2013.01); *F02D 2041/001* (2013.01); *Y02T 10/142* (2013.01); *Y02T 10/144* (2013.01); *Y02T 10/44* (2013.01)

(58) Field of Classification Search
CPC .......... F02B 41/04; F02B 21/00; F02B 37/00; F02B 2275/32; F02D 41/0007; F02D 41/401; F02D 13/0269; F02D 13/0265; F02D 2041/001; Y02T 10/142

See application file for complete search history.

(56) References Cited

U.S. PATENT DOCUMENTS

| | | | |
|---|---|---|---|
| 7,007,639 B1 * | 3/2006 | Luttgeharm | F01L 5/14 123/190.1 |
| 7,690,336 B2 | 4/2010 | Bowman et al. | |
| 7,946,269 B2 * | 5/2011 | Gerum | F02B 21/00 123/321 |
| 8,215,292 B2 | 7/2012 | Bryant | |
| 8,282,528 B2 | 10/2012 | Jager et al. | |
| 8,567,191 B2 | 10/2013 | Geyer | |
| 9,689,305 B2 * | 6/2017 | Doenitz | F02B 21/00 |
| 9,708,967 B2 * | 7/2017 | Gerum | F02B 21/00 |

(Continued)

FOREIGN PATENT DOCUMENTS

JP 06248960 A * 9/1994

*Primary Examiner* — Grant Moubry
(74) *Attorney, Agent, or Firm* — Julia Voutyras; McCoy Russell LLP

(57) ABSTRACT

Methods and systems are provided for injecting air from a compressed air source into an intake port of a Miller Cycle engine. In one example, a method may comprise positioning an intake valve, coupled to a cylinder of a four-cycle internal combustion engine, in an open position during a portion of an intake stroke through a portion of a compression stroke of a piston reciprocating within said cylinder. The method may additionally comprise supplying air to said intake valve from a first source, and injecting air against said intake valve from a second source while said intake valve is open during said compression stroke.

12 Claims, 5 Drawing Sheets

(56) References Cited

U.S. PATENT DOCUMENTS

| | | |
|---|---|---|
| 2005/0241302 A1 | 11/2005 | Weber et al. |
| 2011/0041496 A1 | 2/2011 | Mayr |
| 2012/0216531 A1 | 8/2012 | Schaffeld et al. |
| 2012/0240909 A1 | 9/2012 | Geyer |
| 2012/0279218 A1 | 11/2012 | Ishida et al. |

* cited by examiner

METHODS FOR ENGINE AIR-PATH REVERSION MANAGEMENT

FIELD

The present description relates generally to methods and systems for a Miller Cycle engine.

BACKGROUND/SUMMARY

Conventional four stroke engine combustion cycles, also known as Otto Cycle engines, comprise four distinct strokes: the intake, compression, power, and exhaust strokes. During all four strokes, a piston in a cylinder of the four stroke engine moves between a top dead center (TDC) position, and a bottom dead center (BDC). As the piston moves towards the BDC position, the volume formed between the piston dome and the combustion chamber increases, and vice versa as the piston moves towards TDC. During the intake stroke and the power stroke, the piston moves from the TDC position to the BDC position, whereas during the compression stroke and the exhaust stroke, the piston moves from the BDC position to the TDC position. However, during the intake stroke an intake valve is open and an exhaust valve is closed. In both the compression stroke and the power stroke, the intake valve and the exhaust valve are typically kept closed. During the exhaust stroke, the intake valve is closed, and the exhaust valve is opened.

Thus, in conventional four stroke engines, the intake valve is opened during the intake stroke, and gasses enter the combustion chamber due the negative pressure created as the piston translates towards the BDC position. Additionally, fuel may be injected directly in to the combustion chamber by a fuel injector during the intake stroke. Then, once the piston reaches the BDC position and begins to translate back towards the TDC position at the start of the compression stroke, the intake valve is closed. A spark plug ignites the air/fuel mixture in the combustion chamber before the piston reaches the TDC position, and due to the ignition from the spark plug, the air/fuel mixture expands as the piston reaches the TDC position and begins to move back towards the BDC position. Thus, during the power stroke that follows, the ignited air/fuel mixture exerts a force on the piston which drives the piston towards the BDC position. It is during the power stroke therefore, that power is generated by the engine. Finally, during the exhaust stroke, the exhaust valve opens, allowing the air/fuel mixture to exit the combustion chamber.

However, in an effort to increase the thermodynamic efficiency of the engine, many combustion engines employ a combustion cycle referred to as the "Miller" Cycle. Unlike the conventional four stroke combustion cycle described above, in a Miller Cycle engine, the intake valve is maintained in an open position during a first portion of the compression stroke. As the piston initially moves towards the TDC position in the compression stroke, a portion of the air/fuel mixture, and recirculated exhaust gases under certain conditions such as high engine load operation, may be expelled back into an intake port towards an intake manifold of the engine through the still-open intake valve. This movement of a portion of the air/fuel mixture and exhaust gases in the combustion chamber back towards the intake manifold may be referred to herein as a reversion event. The efficiency of a Miller Cycle engine is increased by the use of a boosting system, either a supercharger or a turbocharger. Additionally, such engine systems may include a charge air cooler for cooling the intake air.

Because the air/fuel mixture may only be compressed after the intake valve is closed, the air/fuel mixture may only be compressed for approximately the final 25% of the compression stroke. In the conventional Otto Cycle engines, the compression ratio is limited due to self-ignition (e.g., detonation) of the compressed, and therefore hot, air/fuel mixture. However, due to the reduced compression of the air/fuel mixture during the compression stroke in a Miller Cycle engine, the compression ratio of a Miller Cycle engine may be increased relative to conventional Otto Cycle engines. Therefore the efficiency of the Miller Cycle engine may be increased relative to Otto Cycle engines.

However, the inventors herein have recognized potential issues with such Miller Cycle engine systems. As one example, the air/fuel mixture in the combustion chamber may be at a higher temperature than gasses in the intake port and an intake manifold due to residual heat in the combustion chamber from previous combustion cycles. Specifically, the heat produced during each combustion cycle may not be fully dissipated at the end of each combustion cycle, resulting in the combustion chamber being at a higher temperature than the intake port and intake manifold. When the air/fuel mixture and recirculated exhaust gases revert back towards the intake manifold through the open intake valve during the first portion of the compression stroke, the hotter air/fuel mixture may reduce the effectiveness of a charge air cooler in cooling an incoming air charge and reverted exhaust gases may leave particulate matter in the air cooler. Further, continued exposure to the hot air/fuel mixture and recirculated exhaust gases may lead to charge air cooler degradation. In both cases, the cooling efficiency of the incoming air charge to the combustion chamber during the intake stroke may be reduced. The reduced cooling efficiency of the charge air cooler may result in increased intake air temperatures, which may cause unintentional detonation, also known as engine knock. Further, crankcase oil may collect in the substrate of the charge air cooler, which may dilute the air/fuel mixture, thereby lowering the octane of the fuel. Lowering the octane of the fuel may also contribute to unintentional detonation events.

Additionally, the portion of the air/fuel mixture that flows out of the combustion chamber to the intake port during the reversion event, opposes the direction of flow of gasses in the intake port during the intake stroke. As such, it may take time for the flow direction in the intake port to be reversed before the next intake stroke. As a result, there may be delay in the flow of gasses into the combustion chamber and therefore the torque delivered by the engine, upon the initiation of an intake stroke.

In one example, the issues described above may be addressed by a method comprising positioning an intake valve, coupled to a cylinder of a four-cycle internal combustion engine, in an open position during a portion of an intake stroke through a portion of a compression stroke of a piston reciprocating within said cylinder, supplying air to said intake valve from a first source; and, injecting air against said intake valve from a second source while said intake valve is open during said compression stroke. In this way, the amount of an air/fuel mixture flowing out of a combustion chamber through the intake valve during a portion of the intake stroke may be reduced.

In another representation, the issues described above may be addressed by a method comprising opening an intake valve coupled to a cylinder of a four-cycle internal combustion engine during an intake stroke of a piston positioned in said cylinder, said engine including an intake manifold coupled to said intake valve through an intake port, supplying air from said intake manifold through said intake port to said intake valve, recirculating a portion of exhaust gases from said engine into said intake valve, closing said intake valve during a compression stroke of said piston, reverting a portion of air and said recirculated exhaust gases from said cylinder through said intake valve and said intake port during said compression stroke while said intake valve is open, and injecting air from an air accumulator into said intake port toward said intake valve against said reverted air and exhaust gases while said intake valve is open during said compression stroke.

As one example, the method may additionally or alternatively comprise supplying compressed air through a heat exchanger to cool said compressed air and routing said cooled compressed air to said intake manifold.

In another example, the method may additionally or alternatively comprise controlling the timing and duration of the air injected into the intake port to either reduce or substantially stop said reverted air and said recirculated exhaust gases from entering said heat exchanger.

In another representation, an engine system may comprise: an air injector positioned in an intake port upstream of an engine cylinder and downstream of a compressor and charge air cooler, an air accumulator fluidly coupled to the air injector for providing compressed air thereto, and a controller with computer readable instructions. The computer readable instructions may include instructions for injecting a desired amount of compressed air from the air accumulator to the intake port via the air injector when the engine cylinder is in a first portion of a compression stroke, where the first portion of the compression stroke is a portion of the compression stroke in which an intake valve of the engine cylinder is in an open position, such that gasses flow between the cylinder and the intake port and otherwise not injecting air to the intake port from the air accumulator.

In this way, the amount of an air/fuel mixture reverted to an intake port through an open intake valve during a portion of a compression stroke may be reduced. By reducing the amount of the air/fuel mixture reverted through the intake valve, degradation to a charge air cooler may be reduced. Further an amount of mixing and atomization of the air/fuel mixture may be achieved by injecting compressed air into the intake port. Specifically, the air injected into the intake port may oppose the direction of flow of the air/fuel mixture from the combustion chamber enters the intake port. As a result, the mixing and atomization of the air/fuel mixture may be increased. Further, the injecting of the air may reverse the direction of motion of the reverted air/fuel mixture, and may therefore reduce its momentum. In this way the responsiveness of an engine may be increased. By reducing the momentum of the air/fuel mixture to the intake port during the compression stroke gasses may flow into the combustion chamber more quickly during a subsequent intake stroke.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for injecting air from a compressed air source into an intake port of a Miller Cycle engine. An engine system, such as the engine system shown in FIG. 1, may comprise one or more engine cylinders. Each of the engine cylinders may undergo a four stroke engine cycle, where each stoke in the cycle is defined by the direction of movement of a piston in its respective cylinder, and the position of intake and exhaust valves of each cylinder. In an intake stroke of the four stroke engine cycle, an intake valve of one of the one or more engine cylinders of the engine is held in an open position. Intake air enters a combustion chamber of the cylinder, as the piston moves away from a TDC position towards a BDC position, expanding the volume created between the piston dome and the combustion chamber. In the Miller Cycle engine, the intake valve is held in the open position after the piston reaches the BDC position and begins the compression stroke. As the piston initially moves towards the TDC position in the compression stroke, a portion of the air/fuel mixture, and any recirculated exhaust gases, may be expelled back into an intake port towards an intake manifold of the engine through the still-open intake valve. This movement of a portion of the air/fuel mixture, and recirculated or residual exhaust gases, in the combustion chamber back towards the intake manifold may be referred to herein as a reversion event.

Figure 2:
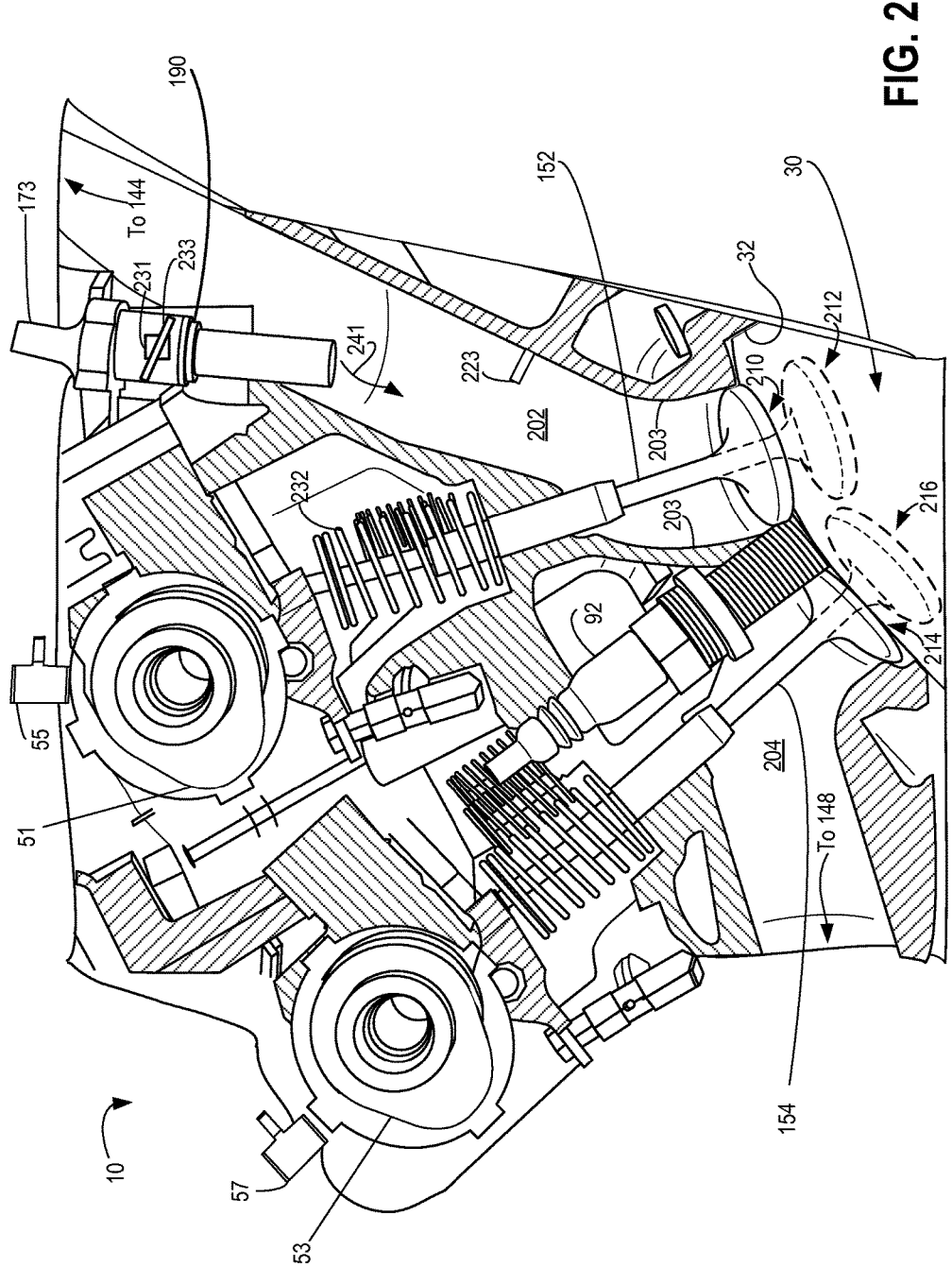
FIG. 2 shows a schematic diagram of an example cylinder of an engine system.

However, the reversion event may reduce the cooling efficiency of a charge air cooler, and may reduce the responsiveness of the engine to increases in desired engine torque levels. To reduce the amount of gasses moving from combustion chamber towards the intake manifold during a reversion event, an air injector may be positioned in the intake port as shown in FIG. 2. The air injector may be configured to inject air into the intake port during a reversion event, under certain engine operating conditions, as described in FIGS. 3 and 5. Further, the air injector may receive compressed air from a secondary source that is not the intake manifold. Specifically, the air injector may receive compressed air from an air accumulator. Compressed air may be provided to the air accumulator from downstream of a compressor under certain engine operating conditions as described in the example method shown in FIG. 4.

As such, the amount gasses flowing from the combustion chamber to the intake port during a reversion event may be reduced by injecting air into the intake port via an air injector positioned in the intake port.

Figure 1:
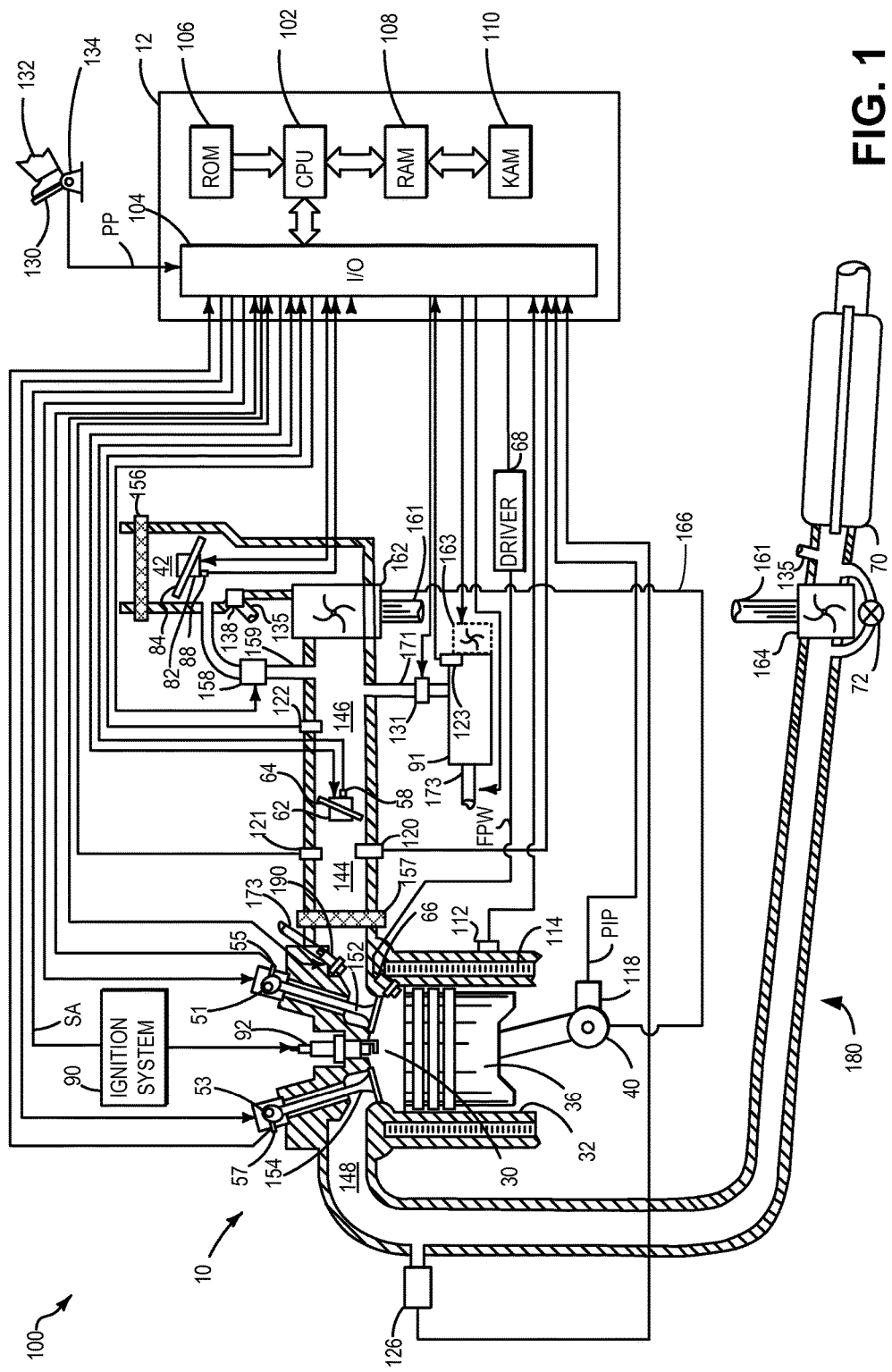
FIG. 1 shows a schematic diagram of an example engine system.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In addition, intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146.

In some embodiments, engine 10 is configured to provide exhaust gas recirculation, or EGR. When included, EGR is provided via EGR passage 135 and EGR valve 138 to the engine air intake system at a position downstream of air intake system (AIS) throttle 82 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 36 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gasses through turbine 164. Specifically, exhaust gases may spin turbine 164 which is coupled to compressor 162 via shaft 161. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage 166, which may be any suitable linkage for mechanically coupling the crankshaft 40 to the compressor 162, such as a belt. As such, a portion of the rotational energy output by the crankshaft 40, may be transferred via the mechanical linkage 166 to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Distributorless ignition system 90 provides an ignition spark to combustion chamber 30 via spark plug 92 in response to controller 12. The ignition system 90 may include an induction coil ignition system, in which an ignition coil transformer is connected to each spark plug of the engine. Universal Exhaust Gas Oxygen (UEGO) sensor 126 is shown coupled to exhaust manifold 148 upstream of catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Both the exhaust valve 154 and the intake valve 152 may be adjusted between respective closed first positions and open second positions. Further, the position of the valves 154 and 152 may be adjusted to any position between their respective first and second positions. In the closed first position of the intake valve 152, air and/or an air/fuel mixture does not flow between the intake manifold 144 and the combustion chamber 30. In the open second position of the intake valve 152, air and/or an air/fuel mixture flows between the intake manifold 144 and the combustion chamber 30. In the closed second position of the exhaust valve 154, air and/or an air fuel mixture does not flow between the combustion chamber 30 and the exhaust manifold 148. However, when the exhaust valve 154 is in the open second position, air and/or an air fuel mixture may flow between the combustion chamber 30 and the exhaust manifold 148.

Thus, during the intake stroke the exhaust valve 154 is in the closed first position so that air and/or an air/fuel mixture does not flow between the combustion chamber 30 and the exhaust manifold 148. However, the intake valve 152 may be in the open second position during the intake stroke, so that air and/or an air fuel mixture flows from the intake manifold 144 to the combustion chamber 30. It is important to note that the direction of airflow between the intake manifold 144 and the combustion chamber 30 when the intake valve 152 is not in the closed first position, depends on the position of the throttle plate 84 and throttle plate 64, and the pressure differential across the interior and exterior of the combustion chamber 30. Thus, under engine operating conditions where the combustion chamber 30 is at a higher pressure than the intake manifold 144, and the intake valve 152 is not in the closed first position, gasses form the combustion chamber may flow out of the combustion chamber 30, towards the intake manifold 144. Conversely, if the combustion chamber 30 is at a lower pressure than the intake manifold 144 when the intake valve 152 is not in the closed first position, such as during the intake stroke, gasses may flow from the intake manifold 144 to the combustion chamber 30.

Thus, during the intake stroke, air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, exhaust valve 154 is closed for the entire duration of the compression stroke, whereas the intake valve 152 is closed for only a portion of the exhaust stroke. More specifically, the intake valve 152 may remain in the open second position after the piston 36 reaches BDC, and begins to move away from BDC at the start of the compression stroke. Thus, the compression stroke comprises the exhaust valve 154 being in the closed first position, and the movement of the piston 36 from BDC to near the top of the cylinder and at the end of compression stroke (e.g., when combustion chamber 30 is at its smallest volume) which is typically referred to by those of skill in the art as top dead center (TDC). During a first portion of the compression stroke, the intake valve 152 may remain in an open position so that gasses may flow between the combustion chamber 30 and the intake manifold 144. Further, as will be described in greater detail below with reference to FIGS. 2-3, an air injector 190 may be coupled in the engine system 100 downstream of the charge air cooler 157, and upstream of the combustion chamber 30 for injecting air from an air accumulator 91 during the first portion of the compression stroke where the intake valve 152 is not in the closed first position.

Air accumulator 91 may be coupled to engine 10, specifically, to intake boost chamber 146 via compressed air passage 171. Thus, compressed air passage 171 may be coupled on one end to the boost chamber 146, and on the other end to the air accumulator 91, for providing fluidic communication therebetween. An accumulator valve 131 may be positioned in the air passage 171 between the boost chamber 146 and the air accumulator 91 for regulating airflow from the boost chamber 146 to the air accumulator 91. The valve 131 may be an electronically controlled valve such as electronic throttle 62, and therefore the position of the valve 131 may be adjusted based on signals received from the controller 12. Specifically, an electronic actuator comprising a coil and armature may be in electrical communication with the controller 12. As such, the electronic actuator of valve 131 may adjust the position of the valve 131 between a closed first position where gasses do not flow between boost chamber 146 and air accumulator 91, and an open second position where gasses may flow between boost chamber 146 and air accumulator 91, based on signals received from the controller. In other embodiments valve 131 may be a passively controlled valve, the position of which may be adjusted based on a pressure differential across the valve.

The valve may be selectively and slightly opened during engine operating conditions to charge the accumulator 91 with compressed air from the intake boost chamber 146, the compressed air delivered to the boost chamber 146 from the compressor 162 coupled to the engine. Once the air accumulator has reached a threshold pressure, the valve may be closed to hold the pressure in the accumulator 91. In some examples, the air accumulator 91 may include a pressure sensor 123 for sensing a pressure in the accumulator 91. As such, the controller may adjust the position of the valve 131 based on the outputs from the pressure sensor 123. Specifically, if the controller determines that the pressure in the air accumulator reaches the threshold based on the outputs from the pressure sensor 123, then the controller may send a signal to the valve 131 for adjusting the position of the valve 131 to the closed first position. Further as described in greater detail below with reference to FIG. 4, the position of the valve 131 may be adjusted based on the desired engine torque as estimated based on input from the vehicle operator 132 via the input device 130. Thus, the valve 131 may only be opened, if the opening of the valve 131 does not impede delivery of the engine torque requested by the vehicle operator 132.

In other embodiments, the air accumulator 91 may comprise its own secondary compressor 163 for providing compressed air to the air accumulator 91. The compressor 163, may be an electric pump, or other type of electrically powered compressor suitable for providing a source of compressed air. When included, the secondary compressor 163, may be in electrical communication with controller 12. As such, the controller 12 may send signals to the secondary compressor 163 for adjusting operation of the compressor 163. Further, the operation of compressor 163 may be adjusted based on the pressure in the air accumulator which may be estimated based on outputs from the pressure sensor 123 as described above.

Compressed air may be supplied to the air injector 190 from the air accumulator via supply conduit 173. Thus supply conduit 173 may be coupled to the air accumulator 91 on one end, and to the air injector 190 at the other end, for providing fluidic communication therebetween. As will be described in greater detail below with reference to FIG. 2, the air injector 190 may comprise a valve (e.g., electronic valve 231 shown in FIG. 2) for regulating an amount of compressed air injected into the engine system 100 downstream of the charge air cooler 157.

Thus, during the first portion of the compression stroke where the intake valve 152 is held in an open position, compressed air from the air accumulator 91, may be delivered via the air injector 190 to downstream of the charge air cooler 157. As will be described in greater detail below with reference to FIG. 3, air injection during the first portion of the compression stroke, may reduce an amount of gasses that may flow from the combustion chamber 30 towards the intake manifold 144.

The first portion of the compression stroke may comprise the portion of the compression stroke where the piston 36 is between BDC, and a second position, where the second position is between BDC and TDC. In some examples the second position may be more proximate BDC than TDC. However, in other examples, the second position may be more proximate TDC than BDC. In still further examples, the second position may be equidistant from TDC and BDC. Thus, the intake valve 152, may only be held in an open position during the compression stroke while the piston 36 moves from BDC to the second position. Once the piston 36 reaches the second position, the position of the intake valve 152 may then be adjusted to the closed first position.

After, the intake valve 152 is closed, piston 36 continues to move toward the cylinder head and TDC, so as to compress the air within combustion chamber 30. Before, the piston 36 reaches TDC, in a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Exhaust gasses may continue to flow from the exhaust manifold 148, to the turbine 164 via an exhaust passage 180. Note that the above is described merely as an example, and that intake and exhaust valve opening and/or closing timings may vary, such as to provide positive or negative valve overlap, late intake valve closing, or various other examples.

Turning now to FIG. 2, it shows a schematic of a combustion chamber, coupled to intake and exhaust ports, with an air injector (as shown in FIG. 1) included in the intake port. Specifically, FIG. 2 shows a schematic of a portion of an example engine cylinder of the engine 10 shown in FIG. 1. FIG. 2 shows an example of the relative sizes and positions of the components within the engine 10. However, it is important to note that the relative sizes and positions of the components of engine 10 may be different than depicted in FIG. 2. FIG. 2, therefore is drawn approximately to scale. Further, the components of the engine 10 shown in FIG. 2 may be the same as the components shown in FIG. 1. Thus, the components of the engine 10 described above with regard to FIG. 1 may not be described in detail again below. As in FIG. 1, one cylinder of the engine 10 is shown.

The engine 10 includes the combustion chamber 30, where the flow of gasses into and out of the combustion chamber 30 is regulated by the positions of the intake valve 152 and the exhaust valve 154. More specifically, the position of the intake valve 152 may be adjusted to regulate the flow of gasses between the combustion chamber 30 and an intake port 202, which is in fluidic communication with the intake manifold 144. Thus, the intake port 202, may be a conduit for transferring gasses between the intake manifold 144 and the combustion chamber 30. As such, the intake port 202 may be downstream of the intake manifold 144 and upstream of the combustion chamber 30, between the intake manifold 144 and the combustion chamber 30. Similarly, the exhaust valve 154 may be adjusted to regulate the flow of gasses between the combustion chamber 30 and an exhaust port 204, which is in fluidic communication with exhaust manifold 148. Thus, the exhaust port 204 may be a conduit for transferring gasses from the combustion chamber 30 to the exhaust manifold 148. As such, exhaust port 204 may be upstream of the exhaust manifold 148, between the combustion chamber 30 and the exhaust manifold 148.

The positions of both the intake valve 152 and the exhaust valve 154 may be adjusted by respective intake cam 51 and exhaust cam 53. However, in other embodiment as described above with reference to FIG. 1, the positions of the intake valve 152 and exhaust valve 154 may be adjusted by electromechanically controlled valve coil and armature assemblies. Further, the intake valve 152 and exhaust valve 154 may be adjusted between closed first positions, 210 and 214, respectively, and open second positions 212 and 216, respectively. In the closed first position 210, the intake valve 152 may fluidically seal the combustion chamber 30 from the intake port 202, so that gasses may not flow therebetween. Specifically, in the closed first position 210, the intake valve 152 may physically contact interior walls 203 of the intake port 202, so that nothing, including air, separates the exterior surface of intake valve 152 from the interior walls 203. As such, the intake valve 152 when in the closed first position may provide a seal between the interior of the combustion chamber 30, and the intake port 202 directly exterior to the combustion chamber 30. However, with the intake valve 152 in the open second position 212, and/or any position between the closed first position 210 and the open second position 212, gasses may flow between the combustion chamber 30 and the intake port 202. In one example the gasses that flow from the combustion chamber 30 to the intake port 202 during a reversion event may only be air. As described above, "reversion event" may be used herein to refer to engine operating conditions when the intake valve is not in the closed first position 210, and a higher pressure exists in the combustion chamber 30 than the intake manifold 144, which results in gasses flowing from the combustion chamber 30 towards the intake manifold 144. However, in other embodiments, the gasses flowing out of the combustion chamber 30 during a reversion event may be an air/fuel mixture containing fuel. Therefore, when the intake valve 152 is not in the closed first position 210, gasses may flow between the intake manifold 144 and the combustion chamber 30, and the direction of the flow of gasses is dependent on the pressure difference therebetween.

In the closed first position 214, the exhaust valve 154 may fluidically seal the combustion chamber 30 from the exhaust port 204, so that gasses may not flow therebetween. However, with the exhaust valve 154 in the open second position 216, and/or any position between the closed first position 214 and the open second position 216, gasses may flow between the combustion chamber 30 and the exhaust port 204. Therefore, when the exhaust valve 154 is not in the closed first position 214, gasses may flow from the combustion chamber 30 to the exhaust manifold 148.

As described above with reference to FIG. 1, outputs from the intake cam sensor 55 and exhaust cam sensor 57 may be used to determine the position of the intake cam 51 and exhaust cam 53, respectively. Since the position of the intake cam 51 is adjusted to adjust the position of the intake valve 152, and the position of the exhaust cam 53 is adjusted to adjust the position of the exhaust valve 154, the positions of the intake cam 51 and exhaust cam 53 are directly related to the position of the intake valve 152 and exhaust valve 154, respectively. Therefore, the position of the intake valve 152 and exhaust valve 154 may be estimated based the outputs from the cam sensor 55 and exhaust cam sensor 57, respectively.

Air injector 190 may be coupled in the intake port 202 as shown in FIG. 2. As described above with reference to FIG. 1, the air injector 190 may receive compressed air via supply conduit 173. The amount of compressed air injected into the intake port 202 may be regulated by injector valve 231 and injector plate 233. The valve 231 may be an electronically controlled valve such as electronic throttle 62 shown FIG. 1, and therefore the position of the valve 231 may be adjusted based on signals received from the controller 12 shown in FIG. 1. Specifically, the injector valve 231 may comprise a coil and armature, and may be in electrical communication with the controller 12. As such, the injector valve 231 may adjust the position of the injector plate 233 between a closed first position where gasses do not flow between supply conduit 173 and intake port 202, and an open second position where gasses may flow between supply conduit 173 and air intake port 202, based on signals received from the controller. Further, the position of the injector plate 233 may be adjusted to any position between the closed first position and open second position to adjust the amount of compressed air flowing to the intake port 202. Specifically, the amount of compressed air flowing to the intake port 202 may increase with increasing deflection of the injector plate 233 away from the closed first position, towards the open second position. In other embodiments valve 231 may be a passively controlled valve, the position of which may be adjusted based on a pressure differential across the valve.

Further, the air injector 190 may be oriented in the intake port 202 such that upon opening of the valve (e.g., adjusting the position of the injector plate 233 away from the closed first position towards the open second position), compressed air may flow through the air injector 190, and into the intake port 202, towards the combustion chamber 30, away from the intake manifold 144. Thus, the direction of compressed airflow in the intake port 202 may be shown by flow arrow 241 in FIG. 2. As described in greater detail below with reference to FIG. 3, air may only be injected into the intake port 202 under certain engine operating conditions during the compression stroke when the intake valve 152 is not in the closed first position. During the compression stroke, when the intake valve 152 is not in the closed first position, gasses may flow from the combustion chamber 30 to the intake port 202, towards the intake manifold 144. The injector valve 231 may adjust the position of the injector plate 233 towards the open second position, and inject compressed air into the intake port 202, during the reversion event where gasses from the combustion chamber 30 propagate back into the intake port 202. As such, the air injected by the air injector 190 may flow in the opposite direction as the flow of gasses in the intake port 202 during the reversion event. An example method for regulating an amount of air injected to the intake port 202 via air injector 190 is described below with reference to FIG. 3.

Figure 3:
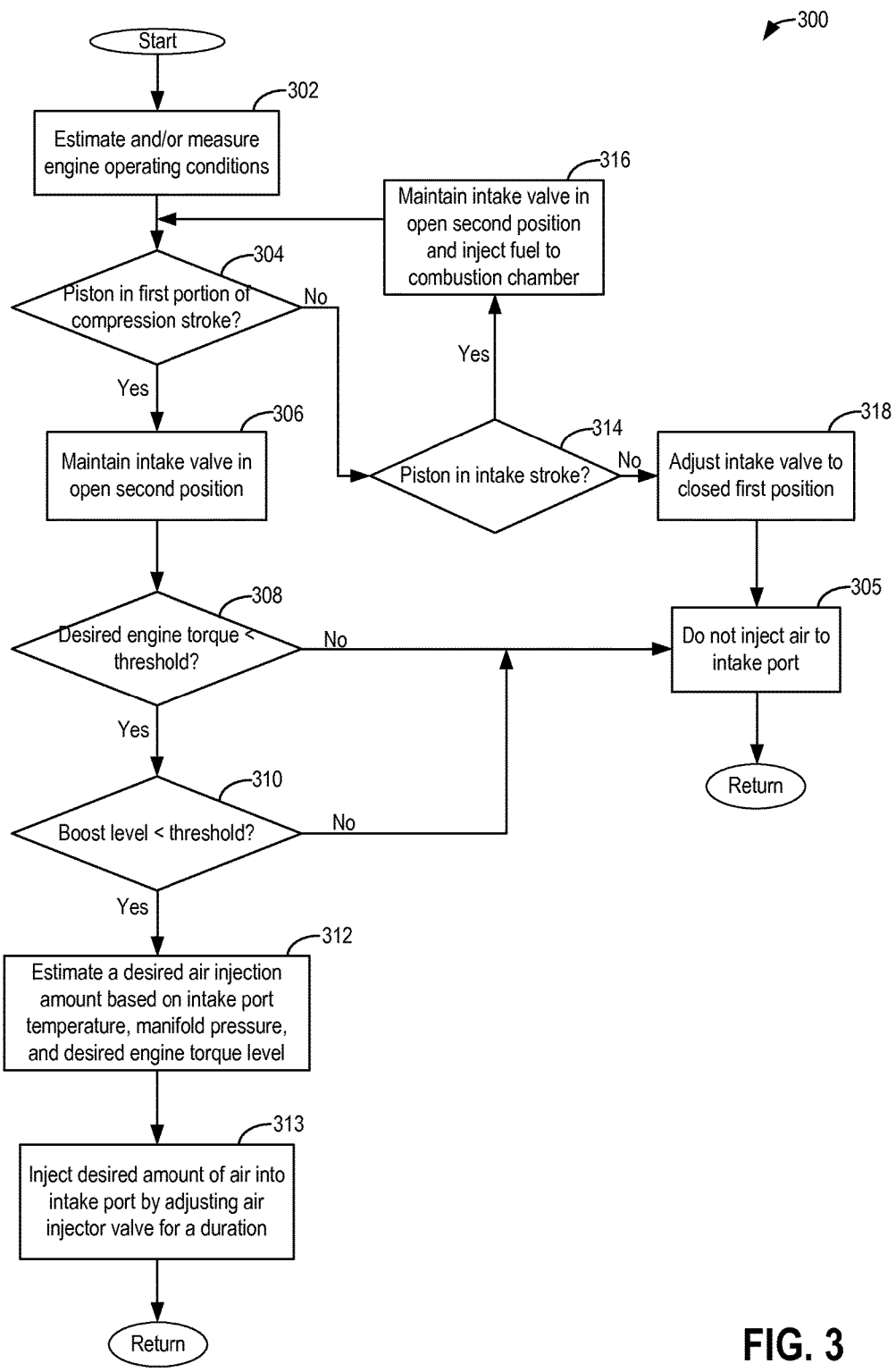
FIG. 3 shows a flow chart of a method for injecting air into an intake port of an engine system.

Turning now to FIG. 3, it shows an example method 300 for injecting air into an intake port of an engine. Specifically, air may be injected to the intake port during a portion of a compression stroke, where an intake valve is held in an open position. As described above with reference to FIGS. 1-2, the intake valve may be held in the open position, such that an air/fuel mixture, and under certain operating conditions recirculated exhaust gases, may flow from a combustion chamber to the intake port, during a portion of the compression stroke. However, since the temperature of the air/fuel mixture may be higher than that of an incoming air charge, the air/fuel mixture may heat the incoming air charge, and/or may reduce the efficiency of a charge air cooler in cooling the incoming air charge. A method, such as the example method 300 shown in FIG. 3, may be executed to inject air in the intake port during the reversion event, so as to reduce the amount of the air/fuel mixture and recirculated exhaust gases pushed back into the intake port from the combustion chamber.

Instructions for carrying out method 300 may be executed by a controller (e.g., controller 12 shown in FIG. 1) based on instructions stored on a memory of the controller and in conjunction with signals received from various sensors of the engine system, such as the sensors described above with reference to FIG. 1. The controller may employ engine actuators of the engine system to adjust engine operation, according to the methods described below.

Method 300 begins at 302, which comprises estimating and/or measuring engine operating conditions. Engine operating conditions may include an engine temperature, an intake manifold vacuum, a position of an intake valve, a position of a throttle valve, etc.

After estimating and/or measuring engine operating conditions at 302, method 300 then continues to 304 which comprises determining if a piston (e.g., piston 36 shown in FIG. 1) in a cylinder of an engine (e.g., engine 10 shown in FIG. 1) is in a first portion of a compression stroke. As explained above with reference to FIGS. 1-2, during the compression stroke, the piston translates away from BDC towards TDC. Therefore, the volume of a combustion chamber (e.g., combustion chamber 36 shown in FIG. 1) is decreasing during the compression stroke. Additionally, unlike the exhaust stroke, where an exhaust valve (e.g., exhaust valve 154 shown in FIGS. 1-2) is in an open second position which provides fluidic communication between the combustion chamber and one or more of an exhaust manifold (e.g., exhaust manifold 148 shown in FIG. 1) and exhaust port (e.g., exhaust port 204 shown in FIG. 2), allowing gasses in the combustion chamber to flow from the combustion chamber to an exhaust manifold, in the compression stroke, the exhaust valve is in a closed first position which fluidically seals off the combustion chamber from the exhaust manifold, so that gasses do not flow between the combustion chamber and the exhaust port. Thus, the compression stroke necessarily comprises the piston traveling away from the BDC position towards the TDC position, and the exhaust valve being in the closed first position The first portion of the compression stroke is a portion of the compression stroke where the piston is in a position between BDC and a second position which is between BDC and TDC. As such, the first portion of the compression stroke may be a portion of the compression stroke which begins at the beginning of the compression stroke, where the piston is at BDC, and ends before the piston reaches TDC. Thus, the first portion of the compression stroke is a portion of the compression stroke where the piston is moving away from BDC to the second position, where the second position is in between BDC and TDC.

In some examples, the second position may be equidistant from TDC and BDC. In other examples the second position may be closer to BDC than TDC. In still further examples, the second position may be closer to TDC than BDC. In another example, the second position may be a position where the distance between the piston and BDC is approximately three times the distance between the piston and TDC. In another example, the second position may be a position where the distance between the piston and BDC is approximately four times the distance between the piston and TDC. Said another way, in some examples, the second position may be a position corresponding to the last 20-30% of the compression stroke. In another example, the second position may be a position where the distance between the piston and TDC is approximately three times the distance between the piston and BDC. In another example, the second position may be a position where the distance between the piston and TDC is approximately four times the distance between the piston and BDC. Said another way, the second position may be a position corresponding to the first 20-30% of the compression stroke.

As such, the first portion of the compression stroke comprises a range of piston positions between BDC and the second position, while the exhaust valve is in the closed first position. As such, the method 300 at 304 may comprise determining if the exhaust valve is in the closed first position, and if the piston is between BDC and the second position, translating away from BDC towards TDC. Output from a crankshaft position sensor (e.g., Hall effect sensor 118 shown in FIG. 1), may be used to determine the position and direction of motion (e.g., velocity) of the piston. Thus, it may be determined whether or not the piston is translating away from the BDC position towards the TDC position based on the outputs from the crankshaft position sensor. Further, the position of an exhaust valve may be determined based on output from an exhaust valve position sensor (e.g., exhaust cam sensor 57 shown in FIGS. 1-2). Thus, it may be determined whether or not the exhaust valve is in the closed first position and exhaust gasses are not flowing from the combustion chamber to one or more of the exhaust port and exhaust manifold based on outputs from the exhaust valve position sensor. Therefore, both the position of the piston as estimated based on outputs from the crankshaft position sensor, and the position of the exhaust valve as estimated based on outputs from the exhaust valve position sensor may be used to determine if the piston is in the first portion of the compression stroke.

If it is determined at 304 that the piston is between BDC and the second position, moving towards the TDC position away from the BDC position, and that the exhaust valve is in the closed first position, then method 300 continues to 306 which comprises maintaining an intake valve (e.g., intake valve 152 shown in FIGS. 1-2) in an open second position (e.g., open second position 212 shown in FIG. 2). With the intake valve in the open second position, an air/fuel mixture, and recirculated exhaust gases, may flow between the combustion chamber and an intake port (e.g., intake port 202 shown in FIG. 2). As described above with reference to FIGS. 1-2, during the intake stroke, the intake valve is held in the open second position to allow air and/or fuel to enter the combustion chamber from one or more of an intake manifold (e.g., intake manifold 144 shown in FIG. 1) and the intake port, as the volume of the combustion chamber expands due to the piston translating away from TDC towards BDC. The method 300 at 306 comprises maintaining the intake valve in the open second position during the first portion of the compression stroke. The position of the intake valve may be adjusted by an intake valve cam (e.g., intake cam 51 shown in FIGS. 1-2). As such, the intake valve cam may maintain the position of the intake valve in the open second position during the first portion of the compression stroke.

In other embodiments, the intake valve may be maintained in an open position, which may be any position between a closed first position (e.g., closed first position 210 shown in FIG. 2), and the open second position, so long as the intake valve is not in the closed first position. Said another way, the term "open position" may be used herein to refer to any position of the intake valve which provides fluidic communication between the intake port and the combustion chamber so that gasses may flow therebetween. Thus, the method 300 at 306 comprises maintaining the intake valve in one or more of the open second position, and/or any position between the closed first position and the open second position which provides fluidic communication between the combustion chamber and the intake port, so that air and/or fuel may flow between the combustion chamber and the intake port during the first portion of the compression stroke.

Therefore, the intake valve may be adjusted by the intake valve cam to one or more positions where gasses flow between the combustion chamber and the intake port during the intake stroke, and continues to remain in said one or more positions, when the piston reaches BDC and begins to translate back towards TDC at the beginning of the compression stroke. The intake valve may remain open during the first portion of the compression until the piston reaches the second position between BDC and TDC. As such, the intake valve may remain open throughout the intake stroke and first portion of the compression stroke, so that gasses may flow between the combustion chamber and the intake port during both the intake stroke and during the first portion of the compression stroke. Said another way, at 306, the method 300 at 306 comprises maintaining the position of the intake valve in one or more open positions so that gasses may flow between the combustion chamber and the intake port, during the first portion of the compression stroke, where the exhaust valve is in the closed first position, and the piston is translating away from BDC towards TDC, until the piston reaches the second position.

Method 300 may then continue from 306 to 308 which comprises determining if the desired engine torque is less than a threshold. In some examples, the threshold at 308 may be stored in the memory of the controller and may correspond to a specific engine torque level. The desired engine torque may be estimated based on input from a vehicle operator (e.g., vehicle operator 132 shown in FIG. 1) via an input device (e.g., input device 130 shown in FIG. 1). Thus, the desired engine torque may be based on the position of an accelerator pedal and/or brake pedal of the input device. The position of the accelerator pedal and/or brake pedal of the input device may be estimated based on outputs of a position sensor (e.g., position sensor 134 shown in FIG. 1) configured to monitor the position of the accelerator and/or brake pedal. The position of the accelerator pedal and/or brake pedal may correspond to a desired engine torque as described above with reference to FIG. 1. If the desired engine torque is less than the threshold at 308, method 300 may continue to 310 which comprises determining if a boost level is less than a threshold.

The boost level may be a pressure of compressed air and/or fuel in the intake manifold. As such, the boost level may be estimated based on outputs of a pressure sensor positioned in the intake manifold (e.g., pressure sensor 121 shown in FIG. 1). Thus, the pressure in the intake manifold, and therefore, the boost level may be estimated based on outputs of the pressure sensor. If the pressure in the intake manifold, and therefore the boost level, is less than the threshold at 310, then method 300 continues to 312 which comprises estimating a desired air injection amount to be injected to the intake port.

Specifically, the method 300 at 312 comprises estimating an amount of air to be injected to the intake port from a compressed air source (e.g., air accumulator 91 shown in FIG. 1) via an air injector (e.g., air injector 190 shown in FIGS. 1-2) based on various operating parameters such as the intake port temperature, manifold pressure, mass air flow to the combustion chamber, and desired engine torque level. The temperature in the intake port may be estimated based on outputs from a temperature sensor (e.g., temperature sensor 223 shown in FIG. 2) positioned in the intake port. In other examples, the temperature in the intake port may be estimated by a temperature sensor positioned elsewhere in the engine (e.g., temperature sensor 112 shown in FIG. 1). The desired engine torque may be estimated in the manner described above at block 308 of method 300, and the manifold pressure may be estimated in the manner described above at block 310 of method 300.

As explained above at block 306, the intake valve may remain in an open position during the first portion of the compression stroke. Due to the open position of the intake valve, gasses may flow between the intake port and the combustion chamber during the first portion of the compression stroke. Therefore, an air/fuel mixture, and any residual or recirculated exhaust gases, in the combustion chamber may be pushed back into the intake port as the piston translates towards the TDC position during the compression stroke. Said another way, as the combustion chamber is compressed due to the piston moving towards the TDC position, a portion of the air/fuel mixture, and any residual or recirculated exhaust gases, in the combustion chamber may flow back into the intake port. In the description herein, this flow back to the intake port during the first portion of the compression stroke may be referred to as a reversion event. The method 300 at 312 comprises determining a desired amount of air to be injected to the intake port during the reversion event.

The method 300 at 312 may therefore further comprise determining a desired amount compressed air to be injected to the intake port based on engine operating parameters such as the intake port temperature, desired engine torque, manifold pressure, and an estimated mass air flow from the intake manifold to the combustion chamber. The desired air injection amount may be based on an amount of air flowing between the intake manifold and the combustion chamber during the reversion event. In one example, the mass air flow rate in the intake manifold may be estimated based on outputs from a mass air flow sensor (e.g., mass air flow sensor 120 shown in FIG. 1). A relationship between the estimated mass air flow in the intake manifold and the desired air injection amount may be stored in the memory of the controller. More specifically, the desired amount of air to be injected to the intake port may increase with decreasing estimated mass air flow rates. Thus, as the mass air flow rate in the intake manifold decreases, the amount of gasses flowing from the combustion chamber through the intake port towards the intake manifold may increase. As such, the desired amount of air injected to the intake port may increase for decreases in the estimated mass air flow rate, so as to reduce the amount of gasses flowing out of the combustion chamber towards the intake manifold.

However, in another embodiment, the desired air injection amount may be based on the intake port temperature, desired engine torque, and manifold pressure. Said another way, the mass air flow rate may be estimated based on the intake port temperature, desired engine torque, and manifold pressure. A relationship between the intake port temperature, desired engine torque, manifold pressure, and the desired air injection amount may therefore be stored in the memory of the controller. More specifically, the desired amount of air to be injected to the intake port may increase with increasing estimated intake port temperatures, decreasing desired engine torque levels, and decreasing manifold pressure. Thus, the method 300 at 312 may comprise estimating the intake port temperature, manifold pressure, and desired engine torque level, and then determining the desired amount of air to be injected to the intake port based on a known relationship between the intake port temperature, manifold pressure, resides engine torque level, and desired air injection amount, which may be stored in the memory of the controller.

After determining the desired air injection amount at 312, method 300 may then continue to 313 which comprises injecting the desired amount of air into the intake port by adjusting the position of an air injector valve for a duration. As explained above with reference to FIGS. 1-2, the air injector may comprise a valve (e.g., valve 191 shown in FIG. 2), which may be actively controlled by the controller. In such examples, the position of the air injector valve may be adjusted by an electromagnetic actuator based on signals received from the controller. In other examples, the valve may be a passive valve, the position of which may be adjusted by changes in the pressure differential across the valve.

The position of the valve may be adjusted between a closed first position where air does not flow between the air accumulator and the intake port, and an open second position where air does flow between the air accumulator and the intake port. Additionally, the valve may be adjusted to any position between the first closed position and the second open position to regulate the amount of air flowing to the intake port. As such, the amount of air flowing from the air accumulator to the intake port may increase with increasing deflection of the valve away from the closed first position to the open second position. Air may flow from the air accumulator to the intake port so long as the valve is not in the closed first position.

The amount of air injected to the intake port via the air injector may also be regulated by the amount of time the air injector valve is held in an open position. Thus, the valve may be adjusted back and forth between the closed first position and the open second position. In the description herein, a valve closure event may be used to refer to when the valve is adjusted to the closed first position. Similarly, a valve opening event may be used to refer to when the valve is adjusted to the open second position. Further, the duration of a valve opening event may be used to refer to the amount of time the valve is held continuously in an open position that is not in the closed first position. Thus, the duration of a single valve opening event may be used to refer to the time between a valve opening event, and a successive valve closure event. Therefore, the total amount of air that flows from the air accumulator to the intake port via the air injector depends on both the position of the air injector valve, and the duration of a valve open event. The amount of air injected to the intake port may increase with increasing durations of the valve being held in an open position. Put more simply, the longer (e.g., greater amount of time) the valve is held in an open position (adjusted away from the closed first position), the larger is the amount of air that will flow to the intake port. The total amount of air flowing to the intake port through the valve, may therefore depend on the pressure difference between the air accumulator and the intake port, the position of the valve of the air injector, and the duration that the valve is held in a position that is not the closed first position. Thus, the air injector valve may be held in an open position for longer periods of time, therefore facilitating more air to be injected to the intake port for increasing intake port temperatures, decreasing manifold pressures, and decreasing desired engine torque levels. Thus, under engine operating conditions where the amount of gasses flowing out of the combustion chamber towards the intake manifold increases, the amount of air injected to the intake port may increase. As such, for decreases in the desired engine torque, which may result in decreases in the manifold pressure and therefore an amount of gasses flowing from the intake manifold to the combustion chamber, the amount of air injected to the intake port may increase.

The position of the air injector valve may be adjusted with increasing deflection towards the open second position away from the closed first position with increasing desired air injection amounts. Additionally or alternatively, the duration of the valve open event may be increased with increasing desired air injection amounts. As such, both the position of the air injector valve, and the amount of time the air injector valve is maintained in a position may be determined based on the desired air injection amount, and a pressure differential between the air accumulator and the intake port. The pressure in the air accumulator may be estimated based on outputs from a pressure sensor positioned in the air accumulator (e.g., air accumulator pressure sensor 123 shown in FIG. 1).

Thus, the method 300 at 313 may additionally include estimating an amount of air that would flow to the intake port based on the pressure difference between the intake port and the compressed air in the air accumulator, a position of the air injector valve, and a duration that the air injector valve may be held in said position. The estimated amount of air to flow to the intake port may be determined based on a relationship stored in the memory of the controller, relating the position of the air injector valve, duration of the open event of the injector valve, and the pressure differential between the air accumulator and the intake port to an amount of airflow to the intake port. Therefore, the method 300 may comprise determining a desired amount of air to be injected to the intake port at 312, and then determining to what position, and for what amount of time to adjust the air injector intake valve to match the amount of air injected to the intake port to the desired amount. As such, the desired air injection amount may be injected to the intake port at 313, by determining how far to open the valve, and for how long, based on a known relationship between the valve position, pressure differential between the intake port and the air accumulator, and the duration of the valve opening event. Said another way, to achieve the desired amount of air injection determined at 312, the method 300 at 313 may comprise determining for how long and how far the valve should be deflected away from the closed first position.

In some examples, the air injected to the intake port via the air injector may oppose a direction of flow of gasses in the intake port. As described above, during the first portion of the compression stroke when the intake valve is in an open position, a portion of the air/fuel mixture in the combustion may flow from the combustion chamber to the intake port, towards the intake manifold. However, the air injector may be positioned in the intake port in the manner described above with reference to FIG. 2, such that the air injected into the intake port, opposes the direction of motion of the air/fuel mixture flowing from the combustion chamber to the intake port. Thus, in some examples, the method 300 at 313 may comprise flowing the compressed air from the air accumulator, through the air injector, into the intake port and towards the combustion chamber. As such, the method 300 at 313 may comprise injecting air into the intake port in a direction that opposes a flow of gasses from the combustion chamber towards the intake manifold.

Thus, the method 300 at 313 comprises injecting air into the intake port during the first portion of the compression stroke when the intake valve is in open position where gasses are permitted to flow between the intake port and the combustion chamber. By injecting air into the intake port during the reversion event, the amount gasses flowing into the intake port from the combustion chamber may be reduced. After the desired amount of air is injected at 313, method 300 then returns.

However, returning to 304, if it is determined that the piston is not in the first portion of the compression stroke, then method 300 proceeds to 314 which comprises determining if the piston is in the intake stroke. As explained above with reference to FIGS. 1-2 during the intake stroke, the intake valve is held in the open second position, and the piston translates away from the TDC towards BDC. During the power stroke, the piston translates away from the TDC position towards the BDC position, but the intake valve is in a closed position such that gasses do not flow between the intake port and the combustion chamber. Thus, the determining if the piston is in the intake stroke necessarily comprises determining that the intake valve is in the closed first position such that gasses do not flow between the intake port and the combustion chamber. As such the method 300 at 314 comprises determining the position and direction of motion of the piston, and the position of the intake valve. The position of the intake valve may be estimated based on outputs from an intake cam sensor (e.g., intake cam sensor 55 shown in FIGS. 1-2). Further, the position and direction of motion (e.g., velocity) of the piston may be estimated based on outputs from the crankshaft position sensor in the manner described above at block 304 of method 300. Thus, if the piston is translating away from the TDC position towards the BDC position, and the intake valve is in the closed first position, then it may be determined at 314 that the piston is in the intake stroke. If it is determined at 314 that the piston is in the intake stroke, then method 300 may continue to 316 which comprises maintaining the intake valve in the open second position and injecting fuel to the combustion chamber. The intake valve may be maintained in the open second position in the manner described above at block 306 of method 300. Fuel may be injected to the combustion chamber via a fuel injector (e.g., fuel injector 66 shown in FIG. 1). In some examples the fuel injector may be positioned in the combustion chamber as shown above with reference to FIG. 1. However, in other examples, the fuel injector may be positioned in the intake port, and/or the intake manifold. The amount of fuel injected to the engine cylinder may be based on a desired air/fuel ratio such as a stoichiometric air/fuel ratio, and a measurement of mass air supplied to the engine derived from mass air flow sensor 120. In place of a measurement of air, an estimate of air supplied to the engine may be determined from intake manifold pressure and engine speed.

In further embodiments, the method 300 at 316 may additionally or alternatively comprise routing a portion of exhaust gasses from downstream of an exhaust turbine (e.g. turbine 164 shown in FIG. 1) to downstream of an air intake system throttle (e.g., AIS throttle 82 shown in FIG. 1). Thus, the method 300 at 316 may comprise routing a portion of EGR gasses from downstream of the exhaust manifold, to upstream of an intake manifold via an EGR passage (e.g., EGR passage 135 shown in FIG. 1). Specifically the routing of the EGR gasses may include adjusting the position of an EGR valve (e.g., EGR valve 138 shown in FIG. 1) between a closed first position where EGR gasses do not flow from downstream of the exhaust manifold to upstream of the intake manifold, and an open first position, where EGR gasses may flow from downstream of the exhaust manifold to upstream of the intake manifold. Thus, the method 300 at 316 may include adjusting the position of the EGR valve towards a more open position, closer to the open second position, to allow for the amount of EGR gasses flowing to upstream of the intake manifold to be increased.

Method 300 may then proceed from 316 back to 304, and determine if the piston has reached the BDC position and is thus in the first portion of the compression stroke. Thus, method 300 may proceed from 304, to 314, to 316, and back to 304 so long as the piston is in the intake stroke. As such, the intake valve may be maintained in the open second position for the duration of the intake stroke. Once the piston has reached BDC, and the intake stroke has terminated, signaling the beginning of the compression stroke, method 300 may then continue to 306 and maintain the intake valve in the open second position for the first portion of the compression stroke as described above.

However, if at 314 it is determined that the piston in not in the intake stroke, then method 300 may continue to 318 which comprises adjusting the intake valve to the closed first position. As described above with reference to block 306 of method 300, the position of the intake valve may be regulated by the intake cam. If the intake valve is already in the closed first position at 318, then the method 300 at 318 may comprise maintaining the position of the intake valve in the closed first position.

The method 300 may then proceed from 318 to 305 which comprises not injecting air to the intake port. Thus, the method 300 at 305 may comprise adjusting the position of the air injector valve to the closed first position, where the intake port and the air accumulator are not in fluidic communication with one another so that air does not flow from the air accumulator to the intake port. As such, if the piston is not in the intake stroke, the air injector valve is adjusted to the closed first position, and air is not injected to the intake port from the air accumulator.

Returning now to 308, if it is determined that the desired engine torque is not less than the threshold at 308, then method 300 continues to 305 and the position of the air injector valve is adjusted to the closed first position so that air is not injected to the intake port. Additionally, if at 310 it is determined that the boost level is not less than the threshold, then method 300 continues from 310 to 305, and the position of the air injector valve is adjusted to the closed first position. Method 300 then returns.

Thus, the air injector valve may be adjusted to the closed second position so that air does not flow from the air accumulator to the intake port if one or more of the piston is not in the first portion of the compression stroke, the desired engine torque is greater than the threshold at 308, and the boost level is greater than the threshold at 310. As such, air injection to the intake port may only be enabled during engine operating conditions where the piston is in the first portion of the compressions stroke, the desired engine torque is less than a threshold, and the boost level (e.g., manifold pressure) is less than a threshold. Further, when engine operating conditions are such that air injection to the intake port is enabled, and the air injector valve is adjusted to a position that is not the closed first position, the position of the valve, and therefore the amount of air flowing to the intake port may be regulated based on operating parameters such as the manifold pressure, intake port temperature, and desired engine torque. Specifically, the position of the valve may be adjusted with increasing deflection towards an open second position away from the closed first position, so that the amount of air flowing to the intake port increases, with one or more of increases in the intake port temperature, decreases in the manifold pressure, and decreases in the desired engine torque.

In this way, a method may comprise injecting compressed air from a compressed air source to an intake port of an engine cylinder during a portion of a compression stroke. Specifically, the method may comprise maintaining an intake valve in open position for a duration immediately following the end of an intake stroke, so that gasses may flow between the intake port and a combustion chamber of the engine cylinder immediately, during the start of the compression stroke. Thus, during the intake stroke, the intake valve is held in an open position so that gasses may flow from the intake port into the combustion chamber. Additionally, during the intake stroke, fuel may be injected to the combustion chamber. Therefore, an air/fuel mixture is introduced to the expanding combustion chamber as the piston translates towards a BDC position from a TDC position during the intake stroke. As the piston reaches the BDC position during the intake stroke, and then begins to return to the TDC position during the start of the compression stroke, the method may comprise maintaining the intake valve in the open position.

Thus, during a portion of the compression stroke, where an exhaust valve is in a closed position such that gasses do not flow from the combustion chamber to an exhaust port, and the piston begins to translate away from the BDC towards the TDC, the intake valve may remain in an open position. Further, the intake valve may remain open during the compression stroke, until the piston reaches a second position between the BDC and TDC. Thus, the intake valve may remain open for a first portion of the compression stroke, the first portion of the compression stroke being a part of the compression stroke coinciding with the beginning of the compression stroke where the piston is at BDC, and terminating at a point in the compression stroke where the piston is at the second position. As such, the first portion of the compression stroke may comprise a range of piston positions during the compression stroke between BDC and the second position.

While the intake valve is in an open position during the first portion of the compression stroke, a portion of the air/fuel mixture admitted to the combustion chamber during the intake stroke, and depending on engine conditions, exhaust gases, may flow back into the intake port as the volume of the combustion chamber is reduced. To decrease the amount of the air/fuel mixture and exhaust gases flowing back into the intake port, air from a compressed air source may be injected to the intake port via an air injector comprising an adjustable valve. Thus, during a reversion event, where the intake valve is held in an open position during a portion of the compression stroke, air is injected to the intake port, to reduce a flow of gasses from the intake port towards the intake manifold. Specifically, compressed air from an air accumulator may be directed to the intake port during the first portion of the compression stroke, when a desired engine torque is less than a threshold, and a manifold pressure is less than a threshold. Further a desired amount of air to be injected to the intake port may be determined based on the manifold pressure, desired engine torque, and a temperature in the intake port. The desired amount of air may be injected to the intake port by adjusting a position of a valve of the air injector for a duration, the duration being an amount of time.

Figure 4:
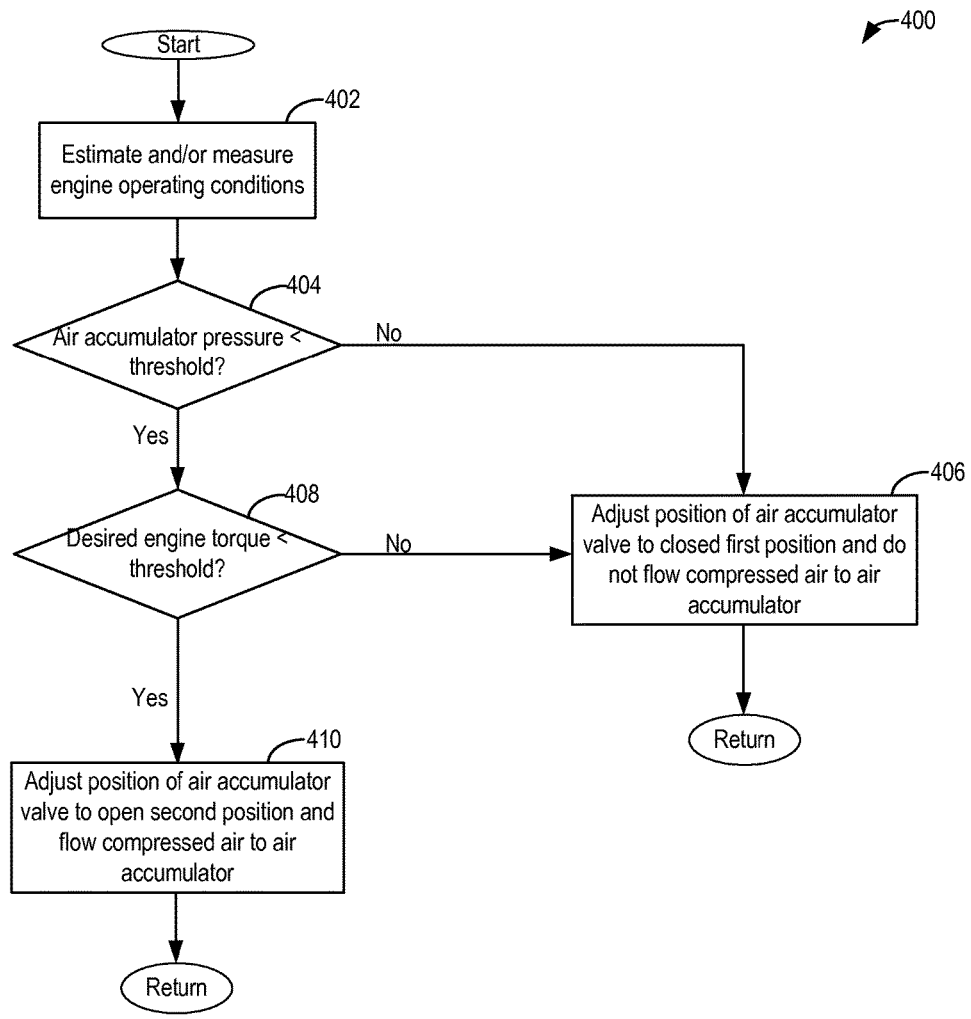
FIG. 4 shows a flow chart of a method for regulating a flow of compressed air to an air accumulator.

Turning now to FIG. 4, it shows an example method for regulating airflow to an air accumulator (e.g., air accumulator 91 shown in FIG. 1) from downstream of a compressor (e.g., compressor 62 shown in FIG. 1). Further, the compressed air stored in the air accumulator may be directed under certain engine operating conditions to an intake port (e.g., intake port 202 shown in FIG. 2) via an air injector (e.g., air injector 190 shown in FIGS. 1-2). As such, a method, such as the method 400 shown in FIG. 4, may be used to regulate the pressure of compressed air delivered to the intake port of an engine (e.g., engine 10 shown in FIG. 1) via the air injector.

Instructions for carrying out method 400 may be executed by a controller (e.g., controller 12 shown in FIG. 1) based on instructions stored on a memory of the controller and in conjunction with signals received from various sensors of the engine system, such as the sensors described above with reference to FIG. 1. The controller may employ engine actuators of the engine system to adjust engine operation, according to the methods described below.

Method 400 begins at 402, which comprises estimating and/or measuring engine operating conditions. Engine operating conditions may include a boost pressure level, engine temperature, an intake manifold vacuum, a position of an intake valve, a position of a throttle valve, etc.

After estimating and/or measuring engine operating conditions at 402, method 400 then continues to 404 which comprises determining if the pressure in the air accumulator is less than a threshold. The pressure in the air accumulator may be estimated based on outputs from a pressure sensor (e.g., pressure sensor 123 shown in FIG. 1). The threshold may represent a threshold pressure below which, the air accumulator may need to be supplied with more air. Further, in some examples the threshold may be stored in the memory of the controller. However, in other examples, the threshold may be estimated based on a pressure in an intake manifold (e.g., intake manifold 144) from outputs of a pressure sensor (e.g., pressure sensor 121) positioned in the intake manifold. As such, the threshold may change depending on engine operating conditions, and the pressure in the intake manifold. The threshold may be a threshold pressure which is higher than the pressure in the intake manifold. As such, when the pressure in the air accumulator is greater than the threshold, air may flow from the air accumulator to the intake manifold if provided with a fluidic path thereto. The method 400 at 404 comprises determining if the air accumulator pressure is less than the threshold. Said another way, the method 400 at 404 may comprise determining if the amount of air in the air accumulator is less than a threshold. Further, the method 400 at 404 may comprise determining if the air accumulator needs to be supplied with air.

If it is determined at 404 that the pressure in the air accumulator is not less than the threshold, then method 400 may continue to 406 which comprises adjusting the position of an air accumulator valve (e.g., accumulator valve 131 shown in FIG. 1) to a closed first position and not flowing compressed air to the air accumulator. As shown above with reference to FIG. 1, the air accumulator valve, may be positioned in a flow path between the air accumulator and a source of compressed air. In some examples the source of compressed air may be from a passage (e.g., boost chamber 146 shown in FIG. 1) downstream of the compressor. If the air accumulator valve is already in the closed first position at 406, the method 400 at 406 may comprise maintaining the position of the valve in the closed first position. Thus, in the closed first position, the air accumulator may restrict the flow of air between the air accumulator and the source of compressed air, such that no air flows therebetween. Method 400 then returns.

However, if it is determined at 404 that the air accumulator pressure is less than the threshold at 404, method 400 continues to 408 which comprises determining if the desired engine torque is less than a threshold. In some examples, the threshold at 408 may be stored in the memory of the controller and may correspond to a specific engine torque level. The desired engine torque may be estimated based on input from a vehicle operator (e.g., vehicle operator 132 shown in FIG. 1) via an input device (e.g., input device 130 shown in FIG. 1). Thus, the desired engine torque may be based on the position of an accelerator pedal and/or brake pedal of the input device. The position of the accelerator pedal and/or brake pedal of the input device may be estimated based on outputs of a position sensor (e.g., position sensor 134 shown in FIG. 1) configured to monitor the position of the accelerator and/or brake pedal. The position of the accelerator pedal and/or brake pedal may correspond to a desired engine torque as described above with reference to FIG. 1.

The threshold may represent a desired torque level, above which a maximum amount of boost pressure is required to meet the desired engine torque. Thus, in some examples, if the desired torque as requested by the vehicle operator exceeds the threshold, all, or nearly all the air compressed by the compressor may be required by the engine to output the amount of torque desired by vehicle operator. Said another way, the threshold at 408 may represent an engine torque level, above which, routing a portion of the compressed air to the air accumulator would reduce the ability of the engine to produce the desired amount of torque. If the desired torque is greater than the threshold at 408, method 400 may continue to 406 and adjust the position of the air accumulator to the closed first position as described above. Method 400 then returns.

However, if at 408, it is determined that the desired engine torque is less than a threshold, then method 400 may continue to 410 which comprises adjusting the position of the air accumulator valve to an open second position and flowing compressed air to the air accumulator. The open second position of the air accumulator valve may be a position of the valve in which gasses may flow between the compressed air source and the air accumulator. However, in other examples, the method 400 at 410 may additionally or alternatively include adjusting the position of the air accumulator to any position between the closed first position and the open second position. As such, the amount of air directed to the air accumulator may be adjusted by adjusting the position of the valve, where the amount of air flowing to the air accumulator increases with increasing deflection of the valve away from the closed first position towards the open second position.

In this way, the method 400 may comprise regulating airflow to the air accumulator based on the pressure in the air accumulator and the desired engine torque. Air may only be supplied to the air accumulator if the pressure in the air accumulator is less than a threshold, and the desired engine torque is less than a threshold. If directing a portion of the compressed air to the air accumulator would inhibit the engine from producing the desired amount of torque, then the air accumulator may be closed, and air may not be flowed to the air accumulator. Thus, air may only be supplied to the air accumulator, if flowing the air to the air accumulator does not reduce the performance of the engine.

In this way, a method may comprise positioning an intake valve, coupled to a cylinder of a four-cycle internal combustion engine, in an open position during a portion of an intake stroke through a portion of a compression stroke of a piston reciprocating within said cylinder, supplying air to said intake valve from a first source, and injecting air against said intake valve from a second source while said intake valve is open during said compression stroke. In some examples, the supplying air to said intake valve from a first source may comprise supplying air from an air compressor driven by one of the following: a turbine coupled to an exhaust of said engine; or a crankshaft of said engine; or an electric motor. The method may additionally or alternatively comprise cooling said air supplied to said intake valve from said first source of air through a heat exchanger. The method may additionally or alternatively comprise injecting fuel into said intake valve during said portion of said intake stroke. In some examples, the fuel may be injected directly into said cylinder. The engine may comprise one of the following: a spark ignited gasoline engine; or, a diesel engine. Injecting air against said intake valve from a second source may comprise injecting air from an accumulator which accumulates air from one or more of the following: a portion of said air from said first source; or, an electric air pump.

In another representation, a method may comprise opening an intake valve coupled to a cylinder of a four-cycle internal combustion engine during an intake stroke of a piston positioned in said cylinder, said engine including an intake manifold coupled to said intake valve through an intake port, supplying air from said intake manifold through said intake port to said intake valve, recirculating a portion of exhaust gases from said engine into said intake valve, closing said intake valve during a compression stroke of said piston, reverting a portion of air and said recirculated exhaust gases from said cylinder through said intake valve and said intake port during said compression stroke while said intake valve is open, and injecting air from an air accumulator into said intake port toward said intake valve against said reverted air and exhaust gases while said intake valve is open during said compression stroke. Supplying air to said intake manifold may in some examples additionally comprise supplying compressed air through a heat exchanger to cool said compressed air and routing said cooled compressed air to said intake manifold. Further, the injected air from said accumulator may be controlled in timing and duration to either reduce or substantially stop said reverted air and said recirculated exhaust gases from entering said heat exchanger. Control of said injected air may be related to one or more of the following: load on said engine, mass airflow of said air supplied to said intake manifold, torque produced by said engine, pressure in said intake manifold, or temperature of said reverted air. In some examples, the method may additionally or alternatively comprise shutting off said injected air when pressure in said intake manifold reaches a predetermined pressure. Further, the method may additionally or alternatively comprise adding fuel to said cylinder during a portion of said intake stroke and wherein said reversion of a portion of air and exhaust gases from said cylinder may include a portion of said added fuel.

Figure 5:
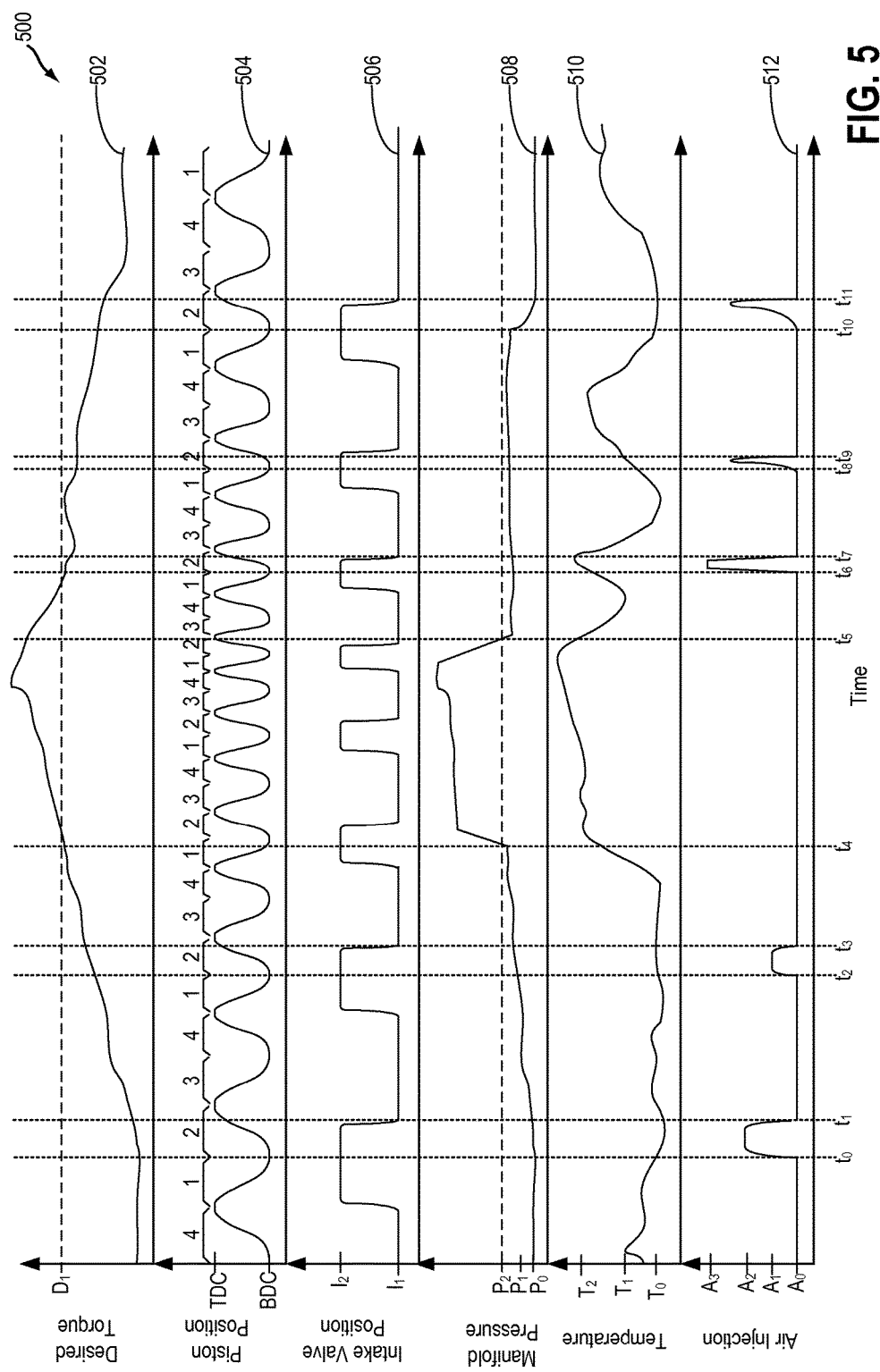
FIG. 5 is a graph illustrating changes in an amount of air injected in an intake port of an engine system under varying engine operating conditions.

Turning now to FIG. 5, a graph 500 is shown, depicting adjustments to an amount of air injected to an intake port (e.g., intake port 202 shown in FIG. 1) of an engine (e.g., engine 10 shown in FIG. 1) based on engine operating conditions. Specifically, graph 500 shows changes in a desired torque at plot 502, manifold pressure at plot 508, piston position at 504, intake valve position at 506, intake temperature at plot 510, and air injection amount at plot 512.

As described above with reference to FIG. 3, the amount of air injected to the intake port of the engine may depend on the position of a piston (e.g., piston 36), the position of an intake valve (e.g., intake valve 152 shown in FIGS. 1-2), the stroke of the engine, the intake manifold pressure, the temperature of gasses in the intake port, and the desired engine torque. Therefore, plot 512 shows changes in the amount of air injected to the intake port based on changes in the engine operating conditions described at plots 502-510. The air injection amount may be adjusted by adjusting the position of valve (e.g., injector valve 231 shown in FIG. 2), in an air injector (e.g., air injector 190 shown in FIGS. 1-2) positioned in the intake port, and coupled to a compressed air source (e.g., air accumulator 91 shown in FIG. 1). Specifically, the position of the injector valve may be adjusted between a closed first position, where no air flows from the injector to the intake port, and an open second position where air may flow from the injector to the intake port. Air injection amount at the lower first level, $A_0$, shown at plot 512, may be approximately zero. Therefore at $A_0$, the injector valve may be in the closed first position, and air may not be flowing to the intake port from the air injector.

The desired torque may be an amount of engine torque commanded by a vehicle operator (e.g., vehicle operator 132 shown in FIG. 1). For example, the desired torque may be estimated by a vehicle controller (e.g., controller 12 from FIG. 1), based on inputs from the vehicle operator via an input device (e.g., input device 130 shown in FIG. 1) which may comprise one or more of a brake pedal and an accelerator pedal. Thus, as explained in greater detail above with reference to FIGS. 1-2, the controller may determine a desired torque based on the position of the input device.

In response to changes in the desired torque as requested by a vehicle driver, an amount of air to be flowed to the engine may be adjusted to match the driver demanded torque. To increase the amount of air flowing a position of a throttle valve (e.g., electronic throttle valve 62 shown in FIG. 1) may be adjusted to allow more air to flow to one or more engine cylinders of the engine. However, if the desired torque increases above a threshold, a compressor (e.g., compressor 62 shown in FIG. 1) may be configured to compress the intake air, raising its pressure, and therefore delivering more air per volume to the engine. The threshold $D_1$, shown at plot 502, corresponds to a desired engine torque level above which the compressor may be turned on and the intake air may be compressed. Correspondingly, the upper first threshold $P_2$, at plot 508 represents the pressure in the intake manifold, above which the compressor may be turned on. Thus, the compressor may be compressing the intake air at intake manifold levels above the upper first threshold $P_2$. As the desired torque increases, a pressure in an intake manifold (e.g., intake manifold 144 shown in FIG. 1) may increase. Changes in the pressure of the intake manifold are shown at plot 508. Specifically, the pressure in the intake manifold may be regulated by operation of the compressor, and a throttle valve positioned downstream of the compressor (e.g., electronic throttle valve 62 shown in FIG. 1). Further, pressure in the intake manifold may be estimated by the controller based on outputs from a pressure sensor (e.g., pressure sensor 121 shown in FIG. 1) coupled in the intake manifold.

The position of the piston is shown at plot 504. As explained above with reference to FIGS. 1-3 the piston may move back and forth between BDC and TDC positions. The position of the piston may be estimated based on outputs from a from a crankshaft position sensor (e.g., Hall effect sensor 118 shown in FIG. 1). As such, outputs from the crankshaft position sensor may be used to determine the position and direction of motion (e.g., velocity) of the piston. Thus, it may be determined whether or not the piston is translating away from the BDC position towards the TDC position based on the outputs from the crankshaft position sensor as described in greater detail above with reference to FIGS. 1-3. Further at plot 504, the four engine strokes are labelled with corresponding numbers. Thus, the intake stroke is labelled as 1, the compressions stroke as 2, the power stroke as 3, and the exhaust stroke as 4. As described above with reference to FIGS. 1-3, the engine stroke may be determined by both the direction of motion of the piston, and based on the positions of the intake valve and an exhaust valve (e.g., exhaust valve 154 shown in FIG. 1). As explained above with reference to FIG. 2-3, the position of the intake valve and exhaust valve may be estimated based on outputs from an intake cam sensor (e.g., intake cam sensor 55 shown in FIGS. 1-2) and an exhaust cam sensor (e.g., exhaust cam sensor 57 shown in FIGS. 1-2), respectively. As seen at plot 504, the engine strokes may become shorter in duration as the desired engine torque increases. Thus, in response to increases in the desired engine torque, the speed of the engine may increase.

Plot 506 shows changes in the position of the intake valve position. The intake valve may be adjusted between a closed first position in which gasses do not flow between a combustion chamber (e.g., combustion chamber 30) and the intake port, and an open second position in which gasses may flow therebetween. $I_1$ represents the closed first position of the intake valve, and $I_2$ represents the open second position of the intake valve. Therefore gasses may flow between the intake port and the combustion chamber so long as the intake valve is not at position $I_1$. The position of the intake valve may be estimated in the manner described above with the intake cam sensor. As described above with reference to FIGS. 1-3, the intake valve may be held in the open second position $I_2$, during a the entirety of the intake stroke, and during a first portion of the compression stroke, where the first portion of the compression stroke is defined as being a part of the compression stroke coinciding with the beginning of the compression stroke where the piston is at BDC, and terminating at a point in the compression stroke where the piston is at the second position. The second position is a position of the piston between TDC and BDC.

Plot 510 shows changes in the temperature of gasses in the intake port. The temperature may be estimated based on outputs from a temperature sensor (e.g., temperature sensor 223 shown in FIG. 2) position in the intake port. However, in other examples the temperature sensor may positioned elsewhere in the engine, such as near an engine cooling sleeve (e.g., temperature sensor 112 shown in FIG. 1).

As described above with reference to FIG. 3, the amount of air injected to the intake port, as shown at plot 412, may increase for increases in the intake port gas temperature, decreases in the desired torque, and therefore decreases in the manifold pressure. Further, air may only be injected to the intake port when the manifold pressure is less than the upper first threshold $P_2$, and the piston is in the first portion of the compression stroke where the intake valve is in the open position $I_2$. It is important to note that the relative time intervals shown in FIG. 5 are only example time intervals. As such, other relative time intervals and combinations of engine operating conditions are possible. For example, the intake valve may be held in the open second position $I_2$, for different proportions of the compression stroke than those shown in FIG. 5.

Turning now to the plots shown in the graph 500, beginning before $t_0$, the desired engine torque is below the threshold $D_1$ as shown at plot 502. In response to the desired engine torque being below $D_1$, the compressor may remain off before $t_0$, and the manifold pressure may remain below $P_2$, and specifically, may fluctuate around a lower second level $P_0$. The intake port temperature may decrease from an intermediate second level $T_1$, to a lower first level $T_0$. Further, the piston may be in an exhaust stroke and intake stroke before $t_0$, and as such the air injection may remain at the lower first level $A_0$.

However, at $t_0$, the desired engine torque may remain below $D_1$, and the manifold pressure may remain below $P_2$. Additionally, the piston may reach the BDC position and begin the compression stroke. As such at $t_0$, the intake valve may be held in the open second position $I_2$, for a first portion of the compression stroke, which may comprise the time interval from $t_0$ to $t_1$. In response to the initiation of the compression stroke at $t_0$, the desired engine torque being below $D_1$, and the intake valve being in the open second position $I_2$, an amount of air injected into the intake port may be increased from the lower first level $A_0$, to a second intermediate level $A_2$. Further at $t_0$, the intake port temperature may be approximately at the lower first level $T_0$.

Between $t_0$ and $t_1$, the intake valve may remain in the open second position $I_2$. As such, the time interval between $t_0$, and $t_1$, may represent the first portion of the compression stroke that began at $t_0$. Thus, between $t_0$ and $t_1$, the piston may be moving towards the TDC position from the BDC position. Further, the manifold pressure may remain around the lower second level $P_0$, and the temperature may remain at around the lower first level $T_0$. As such, the air injection amount may remain at the intermediate second level $A_2$.

At $t_1$, the piston may reach the second position, and in response to the piston reaching the second position, the position of the intake valve may be adjusted from the open second position $I_2$, to the closed first position $I_1$. Thus, at $t_1$, the first portion of the compression stroke that began at $t_0$ may be terminated. In response to the intake valve being closed (e.g., adjusted to the closed first position $I_1$), the air injection amount is decreased to the lower first amount $A_0$. Thus, the air injection may be turned off at $t_1$. Further at $t_1$, the desired engine torque may remain below $D_1$, and the manifold pressure may remain below $P_2$. Further at $t_0$, the intake port temperature may be approximately at the lower first level $T_0$.

Between $t_1$ and $t_2$, the desired torque may monotonically increase, but may remain below the threshold $D_1$. In response to the increase in desired engine torque, the intake airflow may be increased, and thus the manifold pressure may increase from the lower second level $P_0$ to an intermediate third level $P_1$. The intermediate third level $P_1$ is less than the upper first level $P_2$. As such the compressor may remain off between $t_1$ and $t_2$. Further, the temperature may fluctuate around the lower first level $T_0$. No compression strokes may occur between $t_1$ and $t_2$. As such, the air injection amount may remain at the lower first level $A_0$.

At $t_2$, the desired engine torque may remain below $D_1$, and the manifold pressure may remain below $P_2$, at around the intermediate third level $P_1$. Additionally, the piston may reach the BDC position and begin a compression stroke. As such at $t_2$, the intake valve may be held in the open second position $I_2$, for a first portion of the compression stroke, which may comprise the time interval from $t_2$ to $t_3$. In response to the initiation of the compression stroke at $t_2$, and the desired engine torque being below $D_1$, and the intake valve being in the open second position $I_2$, an amount of air injected into the intake port may be increased from the lower first level $A_0$, to an intermediate third level $A_1$. The third level $A_1$ may be less than $A_2$. Thus, due to the manifold pressure being higher at $t_2$ than it was at $t_0$, the amount of air injected to the intake port may be less at $t_2$ than at $t_0$. More specifically, the amount of air flowing from the combustion chamber through the open intake valve to the intake port, may be less at $t_2$ than at $t_0$, because the manifold pressure is greater at $t_2$ than at $t_0$. Since less gasses may flow from the combustion chamber to the intake port at $t_2$ relative to $t_0$, less air may be needed to be injected to oppose the flow of gasses from the combustion chamber to the intake port. Further at $t_0$, the intake port temperature may be approximately at the lower first level $T_0$.

Between $t_2$ and $t_3$, the intake valve may remain in the open second position $I_2$. As such, the time interval between $t_2$, and $t_3$, may represent the first portion of the compression stroke that began at $t_2$. Thus, between $t_2$ and $t_3$, the piston may be moving towards the TDC position from the BDC position. Further, the manifold pressure may remain around the intermediate third level $P_1$, and the temperature may remain at around the lower first level $T_0$. As such, the air injection amount may remain at the intermediate third level $A_1$.

At $t_3$, the piston may reach the second position, and in response to the piston reaching the second position, the position of the intake valve may be adjusted from the open second position $I_2$, to the closed first position $I_1$. Thus, at $t_3$, the first portion of the compression stroke that began at $t_2$ may be terminated. In response to the intake valve being closed (e.g., adjusted to the closed first position $I_1$), the air injection amount is decreased to the lower first amount $A_0$. Thus, the air injection may be turned off at $t_3$. Further at $t_3$, the desired engine torque may remain below $D_1$, and the manifold pressure may remain below $P_2$. Further at $t_3$, the intake port temperature may be approximately at the lower first level $T_0$.

Between $t_3$ and $t_4$, the desired torque may monotonically increase, but may remain below the threshold $D_1$. In response to the increase in desired engine torque, the intake airflow may be increased, and thus the manifold pressure may increase from the increase from intermediate third level $P_1$ but may remain below the upper first level $P_2$. As such the compressor may remain off between $t_3$ and $t_4$. Further, the temperature may monotonically increase from the lower first level $T_0$ to above the intermediate second level $T_1$. No compression strokes may occur between $t_3$ and $t_4$. As such, the air injection amount may remain at the lower first level $A_0$.

At $t_4$, the desired engine torque may reach the threshold $D_1$. In response to the desired engine torque reaching $D_1$, the compressor may be turned on, and as a result the manifold pressure may increase above $P_2$ at $t_4$. The intake port temperature may continue to increase at $t_1$, in response to the pressure of the intake air increasing. The air injection amount may remain at the lower first level $A_0$ at $t_4$, since the piston is in the intake stroke at $t_4$. Further the intake valve may be in the open second position $I_2$ at $t_4$, as the piston is in the intake stroke.

Between $t_4$ and $t_5$, the desired torque may fluctuate above the threshold $D_1$. Thus, the manifold pressure may remain above the upper first threshold $P_2$. Further, the temperature may fluctuate around an upper third level $T_2$, where $T_2$ is higher than $T_1$. However, in response to the desired torque being above $D_1$, and the manifold pressure being above $P_2$, the air injection amount is maintained at the $A_0$ between $t_4$ and $t_5$. The air injection amount is still maintained at $A_0$, even during the first portion of any compression strokes occurring between $t_4$ and $t_5$, since the manifold pressure is high enough to reduce the flow of gasses from the combustion chamber to the intake port when the intake valve is in position $I_2$ during the compression stroke.

At $t_5$, the desired engine torque may begin to monotonically decrease. In response to the decrease in desired engine torque at $t_5$, the compressor may be turned off and/or the power supplied to the compressor may be reduced which may result in the manifold pressure decreasing below $P_2$ at $t_5$. The intake port temperature may fluctuate around $T_2$. The air injection amount may remain at the lower first level $A_0$ at $t_5$, since the piston is in the power stroke at $t_5$. Further the intake valve may be in the closed first position $I_1$ at $t_5$, as the piston is in the power stroke.

Between $t_5$ and $t_6$, the desired torque may decrease to $D_1$. The manifold pressure may remain around $P_1$. Further, the temperature may fluctuate between $T_1$ and $T_2$. The air injection amount is still maintained at $A_0$, as no compression strokes occur between $t_5$ and $t_6$.

At $t_6$, the desired engine torque may decrease below $D_1$, and the manifold pressure may remain below $P_2$, at around the intermediate third level $P_1$. Additionally, the piston may reach the BDC position and begin a compression stroke. As such at $t_6$, the intake valve may be held in the open second position $I_2$, for a first portion of the compression stroke, which may comprise the time interval from $t_6$ to $t_7$. Further, the temperature in the intake port at $t_6$ may be around $T_2$. In response to the initiation of the compression stroke at $t_6$, and the desired engine torque decreasing below $D_1$, and the intake valve being in the open second position $I_2$, an amount of air injected into the intake port may be increased from the lower first level $A_0$, to an upper fourth level $A_3$. The fourth level $A_3$ may be greater than $A_2$. However in other examples fourth level $A_3$ may be approximately the same as $A_2$. Thus, due to the intake port temperature being higher at $t_6$ than it was at $t_2$, the amount of air injected to the intake port may be greater at $t_6$ than at $t_2$.

Between $t_6$ and $t_7$, the intake valve may remain in the open second position $I_2$. As such, the time interval between $t_6$, and $t_7$, may represent the first portion of the compression stroke that began at $t_6$. Thus, between $t_6$ and $t_7$, the piston may be moving towards the TDC position from the BDC position. Further, the manifold pressure may remain around the intermediate third level $P_1$, and the temperature may remain at around $T_2$. As such, the air injection amount may remain at $A_3$.

At $t_7$, the piston may reach the second position, and in response to the piston reaching the second position, the position of the intake valve may be adjusted from the open second position $I_2$, to the closed first position $I_1$. Thus, at $t_7$, the first portion of the compression stroke that began at $t_6$ may be terminated. In response to the intake valve being closed (e.g., adjusted to the closed first position $I_1$), the air injection amount is decreased to the lower first amount $A_0$. Thus, the air injection may be turned off at $t_7$. Further at $t_7$, the desired engine torque may continue to monotonically decrease below $D_1$, and the manifold pressure may remain below $P_2$. Further at $t_7$, the intake port temperature may be approximately at $T_2$.

Between $t_7$ and $t_8$, the desired torque may fluctuate, but may remain below the threshold $D_1$. The manifold pressure may remain around the intermediate third level $P_1$, below the upper first level $P_2$. As such the compressor may remain off between $t_7$ and $t_8$. Further, the temperature may monotonically decrease from $T_2$ to below the intermediate second level $T_1$. No compression strokes may occur between $t_7$ and $t_8$. As such, the air injection amount may remain at the lower first level $A_0$.

At $t_8$, the desired engine torque may be below $D_1$, and the manifold pressure may remain below $P_2$, at around the intermediate third level $P_1$. Additionally, the piston may reach the BDC position and begin a compression stroke. As such at $t_8$, the intake valve may be held in the open second position $I_2$, for a first portion of the compression stroke, which may comprise the time interval from $t_8$ to $t_9$. Further, the temperature in the intake port at $t_8$ may be around $T_1$. In response to the initiation of the compression stroke at $t_8$, and the desired engine torque decreasing below $D_1$, and the intake valve being in the open second position $I_2$, an amount of air injected into the intake port may be increased from the lower first level $A_0$.

Between $t_8$ and $t_9$, the intake valve may remain in the open second position $I_2$. As such, the time interval between $t_8$, and $t_9$, may represent the first portion of the compression stroke that began at $t_8$. Thus, between $t_8$ and $t_9$, the piston may be moving towards the TDC position from the BDC position. Further, the manifold pressure may remain around the intermediate third level $P_1$. However, the temperature in the intake port may monotonically increase above $T_1$ between $t_8$ and $t_9$. As such, the air injection amount may increase between $t_8$ and $t_9$ from $A_0$, up to approximately $A_2$. The amount of increase in the air injection amount may be proportional to the increase in temperature between $t_8$ and $t_9$. Thus, the amount of air injection may increase with increases in the temperature between $t_8$ and $t_9$.

At $t_9$, the piston may reach the second position, and in response to the piston reaching the second position, the position of the intake valve may be adjusted from the open second position $I_2$, to the closed first position $I_1$. Thus, at $t_9$, the first portion of the compression stroke that began at $t_8$ may be terminated. In response to the intake valve being closed (e.g., adjusted to the closed first position $I_1$), the air injection amount is decreased to the lower first amount $A_0$. Thus, the air injection may be turned off at $t_9$. Further at $t_9$, the desired engine torque may continue to monotonically decrease below $D_1$, and the manifold pressure may remain below $P_2$. Further at $t_9$, the intake port temperature may be above $T_1$, but below $T_2$.

Between $t_9$ and $t_{10}$, the desired torque may fluctuate, but may continue to monotonically decrease below $D_1$. The manifold pressure may remain around the intermediate third level $P_1$, below the upper first level $P_2$. As such the compressor may remain off between $t_9$ and $t_{10}$. Further, the temperature may fluctuate between $T_1$ and $T_3$. No compression strokes may occur between $t_9$ and $t_{10}$. As such, the air injection amount may remain at the lower first level $A_0$.

At $t_{10}$, the desired engine torque may be below $D_1$, and the manifold pressure may begin to decrease below $P_1$. Additionally, the piston may reach the BDC position and begin a compression stroke. As such at $t_{10}$, the intake valve may be held in the open second position $I_2$, for a first portion of the compression stroke, which may comprise the time interval from $t_{10}$ to $t_{11}$. Further, the temperature in the intake port at $t_8$ may be around $T_0$. In response to the initiation of the compression stroke at $t_{10}$, and the desired engine torque remaining below $D_1$, and the intake valve being in the open second position $I_2$, an amount of air injected into the intake port may be increased from the lower first level $A_0$.

Between $t_{10}$ and $t_{11}$, the intake valve may remain in the open second position $I_2$. As such, the time interval between $t_{10}$, and $t_{11}$, may represent the first portion of the compression stroke that began at $t_{10}$. Thus, between $t_{10}$ and $t_{11}$, the piston may be moving towards the TDC position from the BDC position. Further, the temperature in the intake port may remain around $T_0$. However, the manifold pressure may monotonically decrease from $P_1$ to $P_0$ between $t_8$ and $t_9$ due to the decrease in the desired engine torque. As such, the air injection amount may increase between $t_{10}$ and $t_{11}$ from $A_0$, up to approximately $A_2$. The amount of increase in the air injection between $t_{10}$ and $t_{11}$ may be inversely proportional to the decrease in temperature between $t_{10}$ and $t_{11}$. Thus, the amount of air injection may increase with decreases in the manifold between $t_{10}$ and $t_{11}$.

At $t_{11}$, the piston may reach the second position, and in response to the piston reaching the second position, the position of the intake valve may be adjusted from the open second position $I_2$, to the closed first position $I_1$. Thus, at $t_{11}$, the first portion of the compression stroke that began at $t_{10}$ may be terminated. In response to the intake valve being closed (e.g., adjusted to the closed first position $I_1$), the air injection amount is decreased to the lower first amount $A_0$. Thus, the air injection may be turned off at $t_{11}$. Further at $t_{11}$, the desired engine torque may continue to monotonically decrease below $D_1$, and the manifold pressure may remain around $P_0$. Further at $t_{11}$, the intake port temperature may remain around $T_0$.

Thus, air may be injected to intake port, only during the first portion of the compression stroke when the intake valve is in the open second position, the desired engine torque is less than the threshold, and the manifold pressure is less than the threshold. Further, the amount of air injected to the intake port may depend on the manifold pressure and the temperature in the intake port. The amount of air injected into the intake port may increase with increasing intake port temperatures and decreasing desired engine torque levels and/or intake manifold pressures.

In this way, an engine system, may comprise an air injector positioned in an intake port upstream of an engine cylinder and downstream of a compressor and charge air cooler, an air accumulator fluidly coupled to the air injector for providing compressed air thereto, and a controller with computer readable instructions. The computer readable instructions may include instructions for injecting a desired amount of compressed air from the air accumulator to the intake port via the air injector when the engine cylinder is in a first portion of a compression stroke, where the first portion of the compression stroke may be a portion of the compression stroke in which an intake valve of the engine cylinder is in an open position, such that gasses flow between the cylinder and the intake port, and otherwise not injecting air to the intake port from the air accumulator. In some examples, the air injector may further comprise an electronic valve which may be adjustable between a first position where compressed air does not flow from the air injector to the intake port, and a second position where compressed air does flow to from the air injector to the intake port. Injecting of the compressed air may further comprise only injecting compressed air to the intake port under engine operating conditions where a desired engine torque and an intake manifold pressure are less than respective thresholds. The desired amount of compressed air to be injected to the intake port may be estimated based on one or more of a temperature of gasses in the intake port, an intake manifold pressure, a desired engine torque, and an air flow rate in an intake manifold, where the intake manifold pressure may be estimated based on outputs from a pressure sensor positioned in the intake manifold of the engine system, the desired engine torque may be estimated based on inputs from a vehicle operator, and the air flow rate in the intake manifold may be based on a mass air flow sensor positioned in the intake manifold. In some examples, the temperature of gasses in the intake port may be estimated based on outputs from a temperature sensor positioned in the intake port. Further, the air accumulator may be in selective fluidic communication with a boost chamber of the engine system via a first valve positioned between the air accumulator and the boost chamber, where the first valve may be adjustable between a first position where gasses do not flow between the air accumulator and the boost chamber, and a second position where gasses do flow between the air accumulator and the boost chamber. The boost chamber may be downstream of the compressor and upstream of the charge air cooler and a throttle valve, where the position of the throttle valve may be adjustable to regulate airflow to the cylinder. Additionally, or alternatively, the first valve may be adjusted to the second position only under engine operating conditions where a desired engine torque is less than a threshold.

In this way, a method may include injecting compressed air from a compressed air source to an intake port of an engine cylinder during a portion of a compression stroke. Specifically, the method may comprise maintaining an intake valve in open position for a duration immediately following the end of an intake stroke during the start of the compression stroke, where in the open position, the valve permits gasses to flow between the intake port and a combustion chamber of the engine cylinder. Thus, as the piston reaches the BDC position during the intake stroke, and then begins to return to the TDC position during the start of the compression stroke, the method may comprise maintaining the intake valve in the open position. Further, the intake valve may remain open during the compression stroke, until the piston reaches a second position between the BDC and TDC. Thus, the intake valve may remain open for a first portion of the compression stroke, the first portion of the compression stroke being a part of the compression stroke coinciding with the beginning of the compression stroke where the piston is at BDC, and terminating at a point in the compression stroke where the piston is at the second position.

However, while the intake valve is in an open position during the first portion of the compression stroke, a portion of the air/fuel mixture admitted to the combustion chamber during the intake stroke may flow back into the intake port as the volume of the combustion chamber is reduced. The air/fuel mixture in the combustion chamber may be at a higher temperature than gasses in the intake port and an intake manifold due to several factors. For example, the air/fuel mixture may be at a higher temperature than the gasses in the intake port due to residual heat that may be present in the combustion chamber from previous combustion cycles. Specifically, the heat produced during each combustion cycle may not be fully dissipated at the end of each combustion cycle, resulting in the combustion chamber being at a higher temperature than the intake port and intake manifold. Further, exhaust gasses that are recirculated to the engine intake passage may also increase the temperature of the intake air, which may reduce the efficiency of the charge air cooler.

Due to the higher temperature of the air/fuel mixture, when the air/fuel mixture reverts back towards the intake manifold during the first portion of the compression stroke, the effectiveness of a charge air cooler may be reduced. Further, continued exposure to the hot air/fuel mixture may lead to charge air cooler degradation. In both cases, the cooling efficiency of the incoming air charge to the combustion chamber during the intake stroke may be reduced. Additionally, during the portion of the compression stroke where the intake valve is held open, the portion of the air/fuel mixture in the combustion chamber that flows out of the combustion chamber to the intake port, flows in the opposite direction as the flow of gasses during the intake stroke. During the intake stroke, gasses flow from the intake manifold and the intake port to the combustion chamber. Said another way, during the reversion event, where the air/fuel mixture flows out of the combustion chamber to the intake port, the air fuel mixture flow direction opposes the flow of gasses in the intake port during the intake stroke.

Because gasses in the intake port may flow in the opposite direction during reversion event, it may take time for the flow direction to be reversed before the next intake stroke. Thus, between subsequent combustion cycles, specifically between the compression stroke of one combustion cycle, and the intake stroke of the subsequent combustion cycle, the direction of gas flow in the intake port may need to be reversed before gasses may flow to the combustion chamber. As a result, there may be delay in the flow of gasses into the combustion chamber upon the initiation of an intake stroke. Further, the delay may cause the torque delivered by the engine to be delayed.

In this way, a technical effect of decreasing degradation to a charge air cooler is achieved by injecting compressed air to an intake port during a portion of a compression stroke where an intake valve is an open position such that gasses may flow between the intake port and a combustion chamber of a cylinder of an engine. Thus, by injecting air into the intake port during the portion of the compression stroke where the intake valve is in an open position, an amount of an air/fuel mixture flowing from the combustion chamber to the intake port may be reduced. Reducing the amount of the air/fuel mixture flowing from the combustion chamber to the intake port may increase the efficiency of the charge air cooler, and may therefore decrease the temperature of an incoming air charge. As such, spontaneous combustion events and engine knocking may be reduced. Another technical effect of increasing the mixing and atomization of an air/fuel mixture may be achieved by injecting compressed air into the intake port. Specifically, the air injected into the intake port may oppose the direction of flow of the air/fuel mixture from the combustion chamber that enters the intake port. As a result, the mixing and atomization of the air/fuel mixture may be increased. Further, the injecting of the air into the intake port may reduce momentum of the reverted air/fuel mixture. In this way, another technical effect of increasing the responsiveness of an engine is achieved by injecting air into the intake port during a portion of the compression stroke where the intake valve is in an open position. By reducing the momentum of the air/fuel mixture to the intake port during the compression stroke while the intake valve is held in an open position, gasses may flow into the combustion chamber more quickly during a subsequent intake stroke. As a result, a technical effect of decreasing the response time of delivered torque may be achieved. Thus, more immediate responses in increases of the delivered engine torque may be achieved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   positioning an intake valve, coupled to a cylinder of a four-cycle internal combustion engine, in an open position during a portion of an intake stroke through a portion of a compression stroke of a piston reciprocating within said cylinder;
   compressing air with an air compressor arranged in an intake passage and directing said compressed air, via said intake passage, into an intake port toward said intake valve; and
   injecting air from an air accumulator into said intake port toward said intake valve, via an air injector coupled in said intake port, while said intake valve is open during said compression stroke.

2. The method recited in claim 1, wherein said air compressor is driven by one of the following: a turbine coupled to an exhaust of said engine; or a crankshaft of said engine; or an electric motor.

3. The method recited in claim 1, further comprising cooling said compressed air via a heat exchanger before said compressed air is supplied into said intake port toward said intake valve via said intake passage.

4. The method recited in claim 1, further comprising injecting fuel directly into said cylinder via a direct fuel injector.

5. The method recited in claim 1, wherein said engine comprises one of the following: a spark ignited gasoline engine; or a diesel engine.

6. The method recited in claim 1, wherein said air accumulator accumulates air from one or more of the following: a portion of said compressed air from said air compressor; or an electric air pump.

7. A method comprising:
   opening an intake valve coupled to a cylinder of a four-cycle internal combustion engine during an intake stroke of a piston positioned in said cylinder, said engine including an intake manifold coupled to said intake valve through an intake port;
   supplying air from said intake manifold through said intake port to said intake valve;
   recirculating a portion of exhaust gases from said engine into said intake port;
   closing said intake valve during a compression stroke of said piston;
   reverting a portion of air and said recirculated exhaust gases from said cylinder through said intake valve and said intake port during said compression stroke while said intake valve is open; and
   injecting air from an air accumulator into said intake port toward said intake valve against said reverted air and exhaust gases while said intake valve is open during said compression stroke.

8. The method recited in claim 7, wherein said supplying air to said intake manifold further comprises supplying compressed air through a heat exchanger to cool said compressed air and routing said cooled compressed air to said intake manifold.

9. The method recited in claim 8, wherein said injected air from said accumulator is controlled in timing and duration to either reduce or substantially stop said reverted air and said recirculated exhaust gases from entering said heat exchanger.

10. The method recited in claim 9, wherein said control of said injected air is related to one or more of the following: load on said engine, mass airflow of said air supplied to said intake manifold, torque produced by said engine, pressure in said intake manifold, or temperature of said reverted air.

11. The method recited in claim 7, further comprising shutting off said injected air when pressure in said intake manifold reaches a predetermined pressure.

12. The method recited in claim 7, further comprising adding fuel to said cylinder during a portion of said intake stroke and wherein said reversion of said portion of air and exhaust gases from said cylinder includes a portion of said added fuel.

\* \* \* \* \*